(12) United States Patent
Lauks et al.

(10) Patent No.: US 12,521,715 B2
(45) Date of Patent: Jan. 13, 2026

(54) SYSTEM FOR DELIVERING FLUID SAMPLES THROUGH A FLUIDIC DEVICE AND METHODS THEREFOR

(71) Applicant: Siemens Healthcare Diagnostics Inc., Tarrytown, NY (US)

(72) Inventors: Imants Lauks, Ottawa (CA); Nigel Fairbank, Ottawa (CA)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 1149 days.

(21) Appl. No.: 17/593,645

(22) PCT Filed: Mar. 20, 2020

(86) PCT No.: PCT/US2020/023816
§ 371 (c)(1),
(2) Date: Sep. 22, 2021

(87) PCT Pub. No.: WO2020/197988
PCT Pub. Date: Oct. 1, 2020

(65) Prior Publication Data
US 2022/0212191 A1    Jul. 7, 2022

Related U.S. Application Data

(60) Provisional application No. 62/823,817, filed on Mar. 26, 2019.

(51) Int. Cl.
*B01L 3/00* (2006.01)
*G01N 35/00* (2006.01)
(Continued)

(52) U.S. Cl.
CPC ... *B01L 3/502738* (2013.01); *B01L 3/502715* (2013.01); *B01L 3/50273* (2013.01);
(Continued)

(58) Field of Classification Search
None
See application file for complete search history.

(56) References Cited

U.S. PATENT DOCUMENTS 5,186,431 A * 2/1993 Tamari ............... A61M 60/38
                                                       251/5
5,287,733 A * 2/1994 Oku ....................... G01N 35/00
                                                       422/81
(Continued)

FOREIGN PATENT DOCUMENTS

| WO | WO-2010138186 A1 * | 12/2010 | ............. B01L 3/502 |
| WO | 2015191916 A1 | 12/2015 | |
| WO | WO-2018009920 A1 * | 1/2018 | ............. B01L 3/5027 |

OTHER PUBLICATIONS

International Search Report and Written Opinion of International Application No. PCT/US2020/023816 dated May 21, 2020.

*Primary Examiner* — Elizabeth A Robinson
*Assistant Examiner* — Brittany I Fisher

(57) ABSTRACT

A method for delivering a fluid sample through a channel of a diagnostic consumable is disclosed. The method includes receiving the diagnostic consumable in a reader comprising a delivery system, operatively connecting the delivery system to the channel, and applying pressure pulses to the channel at a predetermined frequency. A reader for reading a diagnostic consumable is also disclosed.

11 Claims, 22 Drawing Sheets

(51) Int. Cl.
   *G01N 35/10*   (2006.01)
   *A61B 5/15*    (2006.01)
   *G01N 33/48*   (2006.01)
   *G01N 33/49*   (2006.01)
   *G01N 33/50*   (2006.01)

(52) U.S. Cl.
   CPC .. *G01N 35/1097* (2013.01); *B01L 2300/0645* (2013.01); *B01L 2300/0816* (2013.01); *B01L 2300/087* (2013.01); *B01L 2400/049* (2013.01); *B01L 2400/0666* (2013.01); *G01N 2035/00237* (2013.01); *G01N 2035/1034* (2013.01)

(56) References Cited

U.S. PATENT DOCUMENTS

| | | | |
|---|---|---|---|
| 5,628,961 | A | 5/1997 | Davis et al. |
| 6,016,712 | A * | 1/2000 | Warden ............... G01N 33/4905 |
| | | | 73/864.22 |
| 7,040,144 | B2 | 5/2006 | Spaid et al. |
| 8,079,335 | B2 | 12/2011 | Rollinger et al. |
| 2004/0189311 | A1 | 9/2004 | Glezer et al. |
| 2012/0329082 | A1* | 12/2012 | Viola ................... G01N 29/222 |
| | | | 435/13 |
| 2014/0161668 | A1 | 6/2014 | Colella et al. |
| 2017/0113221 | A1* | 4/2017 | Hoffman .......... G01N 35/00069 |
| 2018/0059125 | A1 | 3/2018 | Gorin et al. |

* cited by examiner

SYSTEM FOR DELIVERING FLUID SAMPLES THROUGH A FLUIDIC DEVICE AND METHODS THEREFOR

CROSS REFERENCE TO RELATED APPLICATIONS

This application disclosure is a 371 of PCT/US2020/023816, filed Mar. 20, 2020, which claims the benefit under 35 U.S.C. § 119 (e) of U.S. Provisional Patent Application No. 62/823,817, filed on Mar. 26, 2019, the entire contents of which are hereby incorporated herein by reference in their entireties for all purposes.

FIELD

This disclosure relates generally to fluidic devices and, in particular, to a system and method for delivering a fluid sample through a fluidic device, such as a diagnostic consumable.

BACKGROUND

Fluidic devices are used to control and/or manipulate fluids for any of a variety of applications. A fluidic device could include channels that constrain the flow of a fluid in the device. A channel could be considered a microchannel if at least one dimension of the channel (a radius, width or height, for example) is sub-millimeter, and/or if the channel carries sub-milliliter volumes of fluid. A fluidic device that includes a microchannel, and/or other microscale components, could be considered a microfluidic device.

Fluidic devices could incorporate and/or be coupled to one or more sensors to provide sensing capabilities. For example, a sample fluid could be delivered through channels in a fluidic device to a sensing region of the fluidic device in order to be exposed to a sensor. The sensor could be incorporated into the fluidic device and/or part of a separate device to which the sensing region is exposed in order to measure one or more properties of the fluid. A fluidic device that incorporates one or more sensors or sensing regions could be used as a diagnostic device. In the context of medical diagnostic devices, fluidic devices could be used in the measurement of one or more properties of a bodily fluid. By way of example, a blood sample could be added to a fluidic device to control and/or manipulate the blood sample in order to measure the concentration of certain analytes in the blood.

In recent years, miniature fluidic devices have attracted attention for use in the field as diagnostic devices for point-of-care testing. A fluidic device in this field usually provides integration of multiple analytical steps into a single device. A fluidic device may perform one or more assays. For the purposes of the instant disclosure, an assay may be defined as a procedure for quantifying the amount or the functional activity of an analyte in a liquid sample. An assay may involve a variety of operations on the fluidic device, such as sample introduction, preparation, metering, sample/reagent mixing, liquid transport, and detection, etc. Typical diagnostic assays involve manipulating and delivering small volumes of fluid with precise control, which can be challenging due to several factors, such as fluid loss in transport, capillary effects, impact of gravity, trapped air and others.

SUMMARY

According to an aspect of the present disclosure, there is provided a reader for reading a diagnostic consumable, the reader comprising: a reader opening for receiving the diagnostic consumable; and a delivery system configured and arranged to operatively connect to the diagnostic consumable in the reader opening for delivering a fluid sample through a channel of the diagnostic consumable, the delivery system comprising: a vacuum source, a charge vessel fluidly connected to the vacuum source upstream of the vacuum source, a first valve immediately upstream of the charge vessel, and a second valve immediately downstream of the charge vessel, wherein the first and second valves are operable to open and close at a predetermined frequency to alternatingly charge and discharge the charge vessel, thereby applying vacuum pressure pulses to the channel of the diagnostic consumable.

In some embodiments, the vacuum source comprises a vacuum pump.

In some embodiments, the reader further comprises a source vessel fluidly connected to the vacuum source and charge vessel between the vacuum source and the charge vessel, wherein a volume of the source vessel is larger than a volume of the charge vessel.

In some embodiments, the reader further comprises a vacuum controller configured to open and close the first and second valves at the predetermined frequency.

In some embodiments, the vacuum controller is further configured to vary the predetermined frequency in dependence on the viscosity of the fluid sample.

In some embodiments, the reader further comprises a third valve downstream of the source vessel between the source vessel and the vacuum source, wherein the third valve is operable to close when a source pressure in the source vessel has reached a predetermined vacuum pressure.

In some embodiments, the charge vessel is dimensioned in dependence on a viscosity range of the fluid samples to be delivered.

In some embodiments, the first and second valves are solenoid-type valves.

In some embodiments, the reader further comprises a vacuum controller configured to control the vacuum pressure provided by the vacuum source.

In some embodiments, the diagnostic consumable is a diagnostic card.

According to another aspect of the present disclosure, there is provided a method for delivering a fluid sample through a channel of a diagnostic consumable, the method comprising: receiving the diagnostic consumable in a reader comprising a delivery system, operatively connecting the delivery system to the channel, applying pressure pulses to the channel at a predetermined frequency.

In some embodiments, the fluid sample is a human blood sample.

In some embodiments, the pressure of the pressure pulses is dependent on the viscosity of the fluid sample.

In some embodiments, the method further comprises adjusting the predetermined frequency in dependence on the viscosity of the fluid sample, wherein the predetermined frequency is increased for more viscous fluid samples.

In some embodiments, the method further comprises adjusting the predetermined frequency in dependence on the speed of travel of the fluid sample within the channel.

In some embodiments, applying the pressure pulses to the channel comprises pressurizing a charging vessel to a predetermined pressure and fluidly connecting the pressurized charging vessel to the channel.

In some embodiments, applying the pressure pulses to the channel further comprises pressurizing a source vessel operably connected to the charging vessel and using the source vessel to pressurize the charging vessel, wherein a volume of the source vessel is larger than a volume of the charge vessel.

In some embodiments, applying the pressure pulses to the channel further comprises pressurizing the source vessel using a pressure source operably connected to the source vessel.

In some embodiments, the pressure source is a vacuum pump and the pressure pulses are vacuum pressure pulses.

In some embodiments, the method further comprises controlling a first valve and a second valve to open and close the charge vessel at the predetermined frequency to alternatingly charge and discharge the charge vessel.

Other aspects and features of embodiments of the present disclosure will become apparent to those ordinarily skilled in the art upon review of the following description.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION

Fluidic devices, such as fluidic devices incorporating diagnostic assays, can receive fluid samples of varying viscosity. A sample's viscosity is related to the amount of drag the sample experiences as it is delivered through one or more channels of the fluidic device. Assuming a constant force being applied to the fluid sample, for example by a constant pressure, samples with different viscosities will take different amounts of time to travel to a desired location within the fluidic device, for example an assay region. This may be undesirable, particularly for bodily fluid samples, such as blood—where viscosity correlates with haematocrit—because sample analytes may change during the period of delivery from a sample entry region, or reservoir, to the assay region. Thus, assuming a simple external constant-pressure source is used to deliver the fluid sample to the assay region, delivery time—and, thus, the integrity of the sample—varies with viscosity.

Embodiments according to the present disclosure may be used to deliver fluid samples with different viscosities to predetermined and/or desired regions of the fluidic device in substantially similar times or within a range of times that is narrower than compared to a constant-pressure source delivery system, while also preventing low viscosity samples from being delivered at undesirably high speeds at which stopping the sample accurately may pose difficulties.

Diagnostic assays may be embodied on a consumable fluidic device, also referred to herein as a diagnostic consumable. Consumable in this sense does not necessarily mean that any portions of the device are consumed during operation, but that the device may be a single-use diagnostic device that is not re-used.

Some such diagnostic consumables may be embodied as a credit card-shaped consumable that is inserted into a reader (i.e. diagnostic reading device), such as a card reader, in order to run the diagnostic. Some embodiments of the present disclosure will be described in reference to a card reader and diagnostic card that is read by the card reader. However, it will be understood that the principles of the present disclosure are applicable to other types of diagnostic consumables and fluidic devices generally, whether consumable or not.

According to embodiments of the present disclosure, a diagnostic consumable receives a sample that is delivered through channels of the diagnostic consumable to one or more assays or assay regions. The card reader may be used to perform one or more assays by, for example, incorporating sensors or by incorporating one or more modules, such as a processor module, that receives signals and/or data from one or more assays and/or sensors in the diagnostic consumable and processes those signals and/or data. The reader may also include one or more devices or systems that cooperate with the diagnostic consumable to deliver the sample through the channels of the diagnostic consumable.

Figure 1:
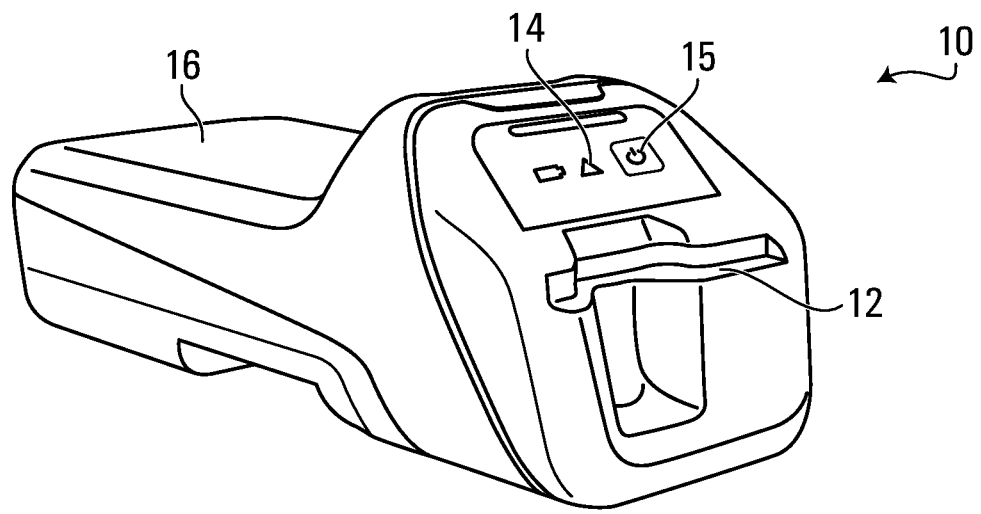
FIG. 1 is a perspective view of a reader according to one embodiment of the present disclosure.
Figure 2:
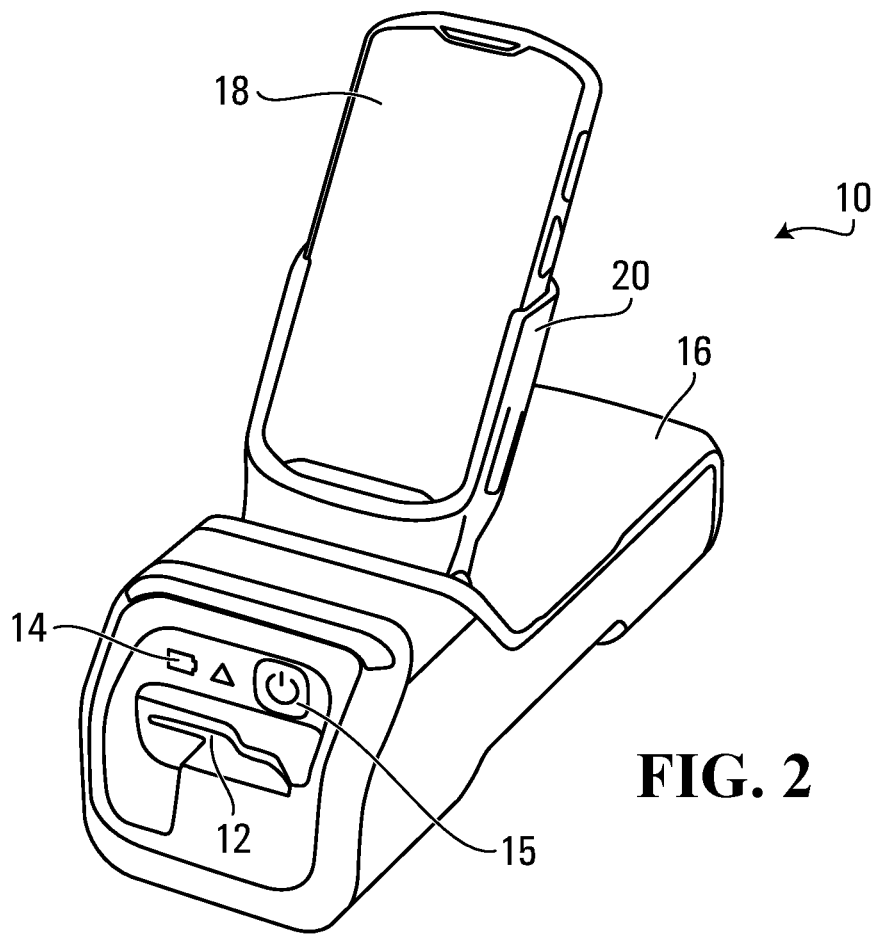
FIG. 2 is a perspective view of a reader according to another embodiment of the present disclosure.

Referring to FIGS. 1 and 2, embodiments of a reader 10 include a reader opening 12 for receiving a diagnostic consumable; a control portion 14, including a power button 15; and a body 16. In the embodiment of FIG. 2 a display device 18 for displaying, among other things, results of one or more diagnostic tests conducted by or with the diagnostic consumable is also shown. The display device 18 may be integrally assembled with the remainder of the reader 10 or it may be a separable display device that is operably connectable to the reader 10. The display device 18 may be inserted into a holder 20, in which electrical connections (not shown) for power and/or data transfer are provided for connecting to the display device 18. The display device 18 may also be a separate unit containing a processor, such as a mobile device, personal digital assistant, or other screen-enabled device. The reader 10 may be capable of a wired and/or wireless connection to the display device 18 or other device for the purposes of transmitting and/or receiving data. For example, the reader 10 may be configured to transmit data directly to a hospital records system.

Figure 3:
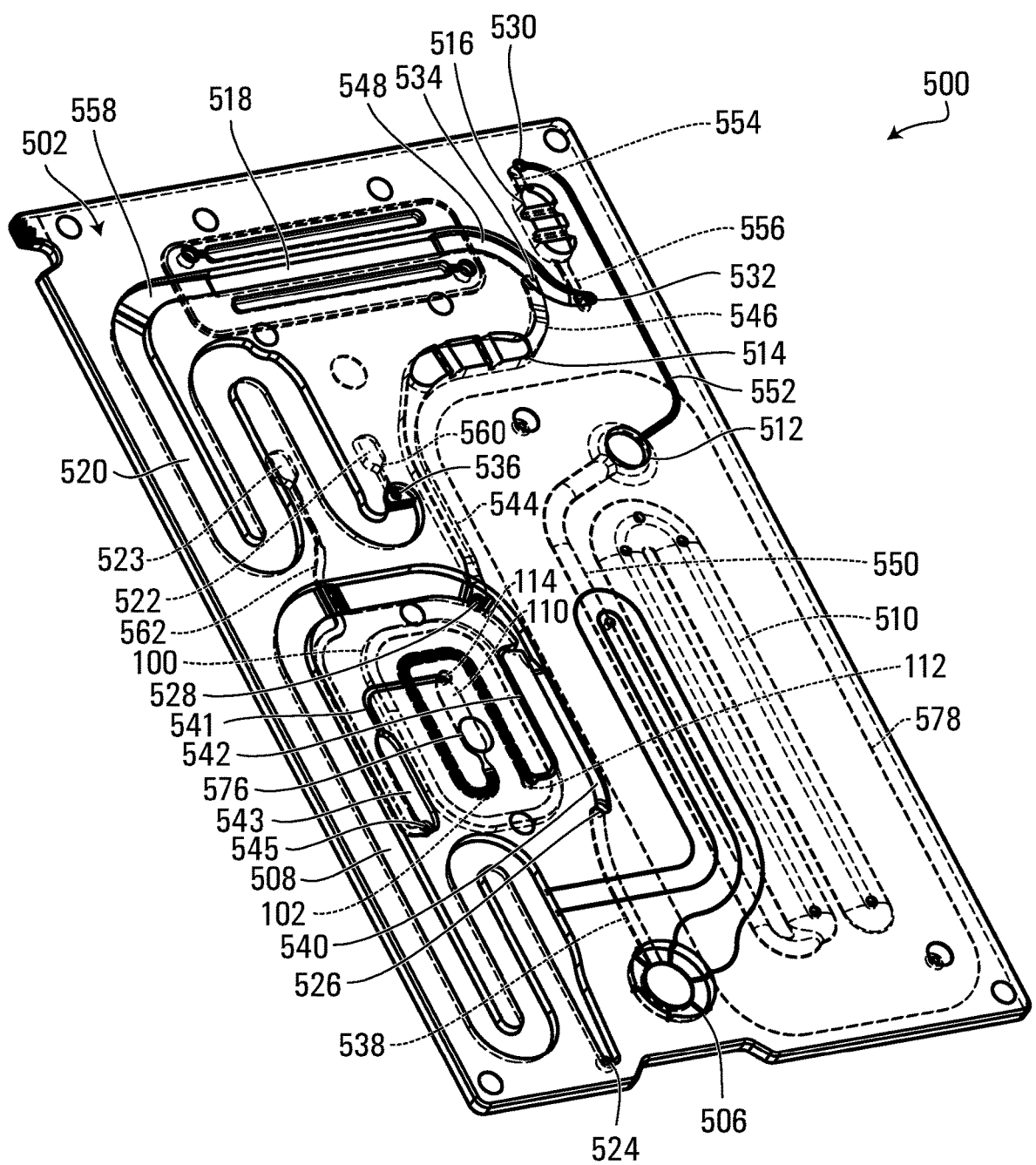
FIG. 3 is an isometric view of the top of an example substrate for a diagnostic consumable.
Figure 4:
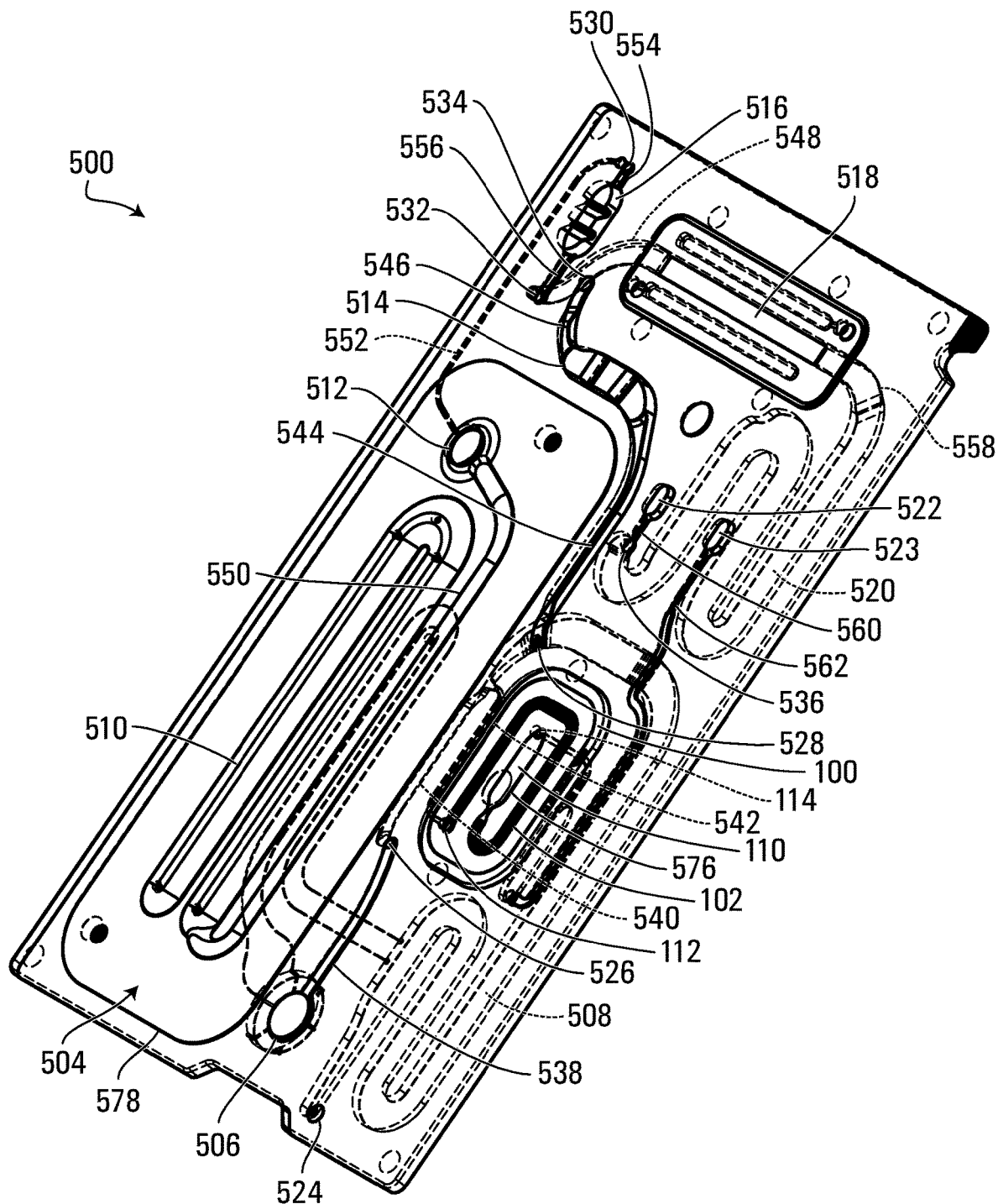
FIG. 4 is an isometric view of the bottom of the substrate of FIG. 3.
Figure 5:
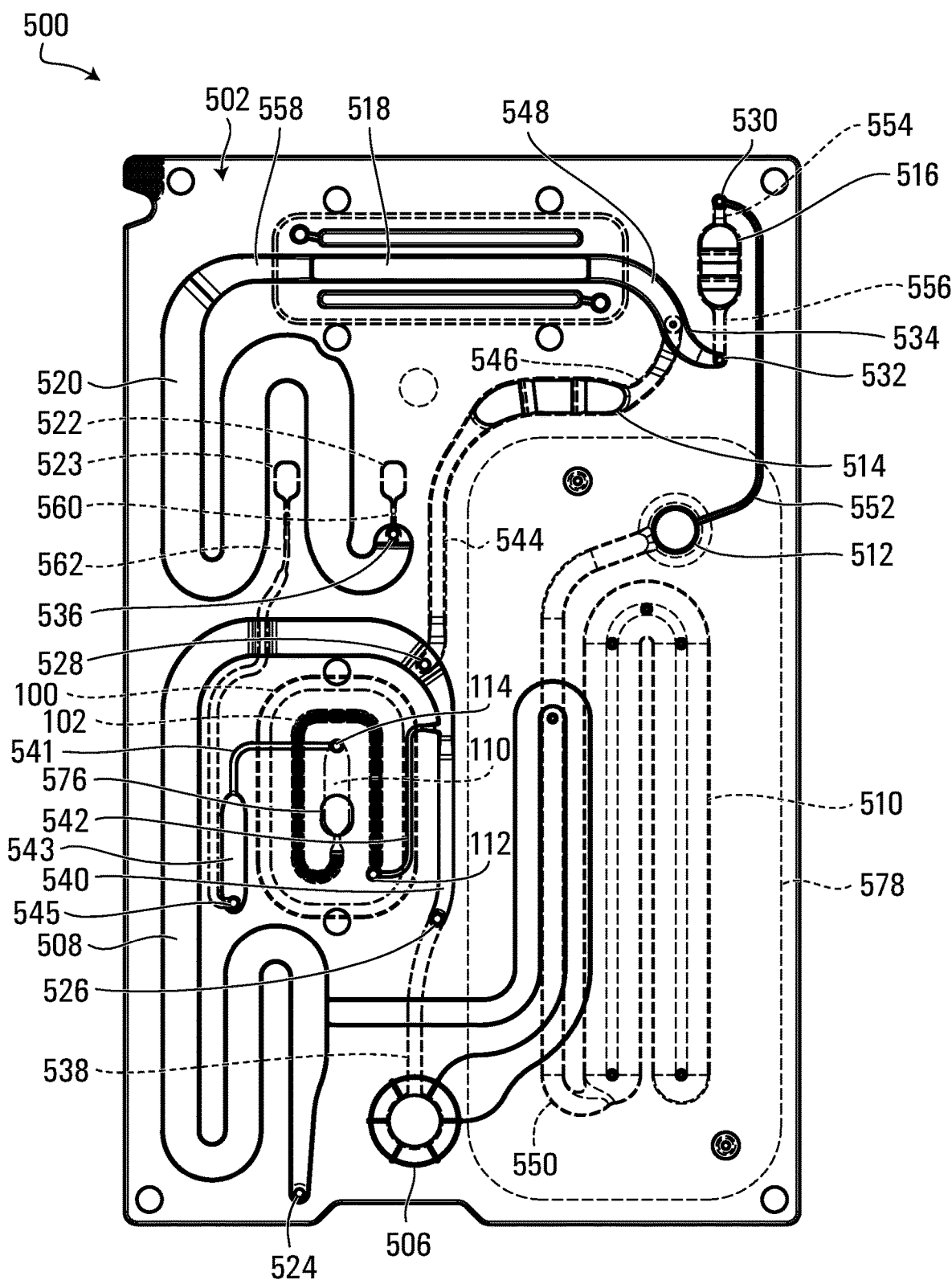
FIG. 5 is a plan view of the top of the substrate of FIG. 3.
Figure 6:
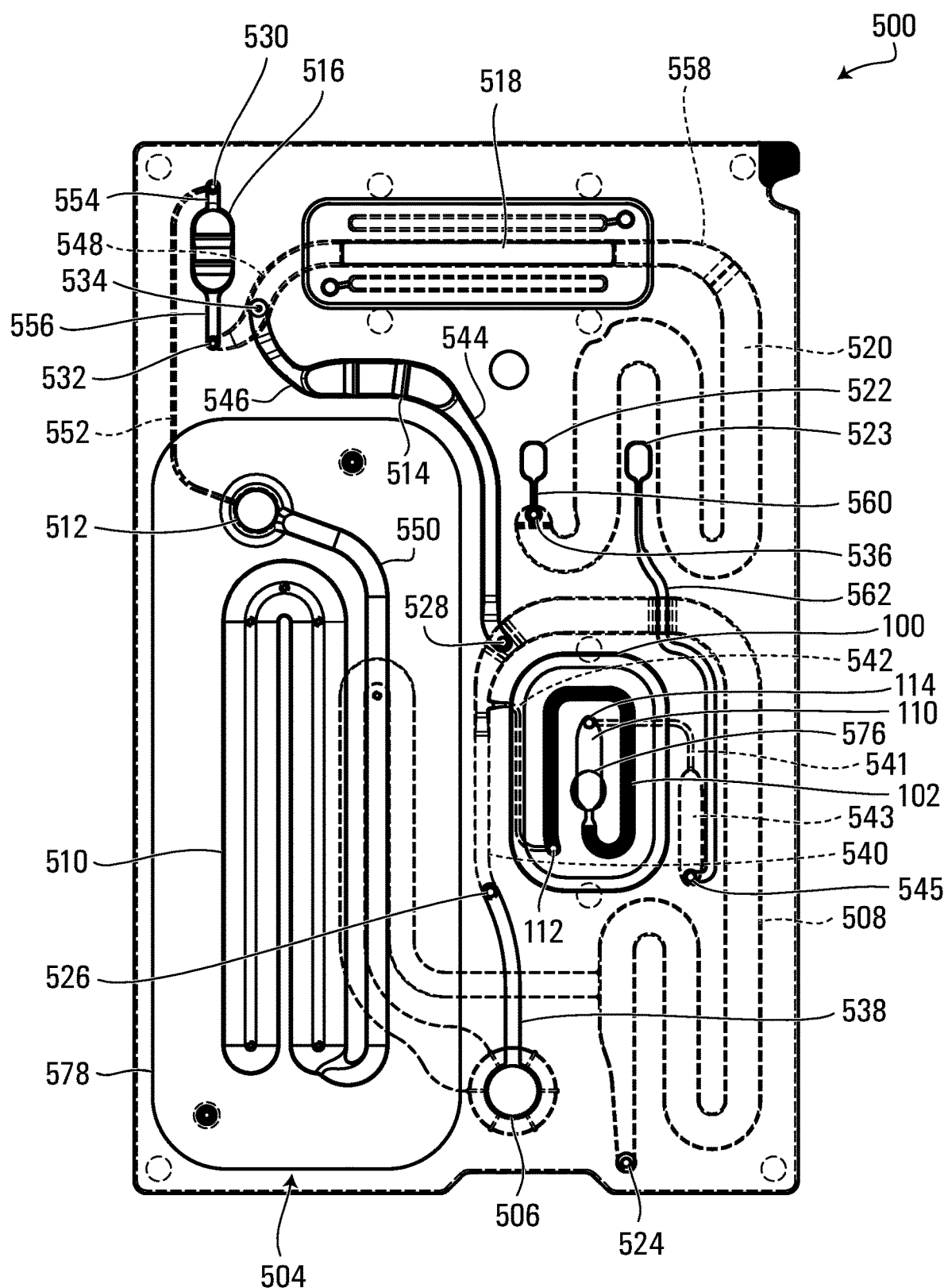
FIG. 6 is a plan view of the bottom of the substrate of FIG. 3.

Referring to FIGS. 3 to 8, one embodiment of a diagnostic consumable, such as a diagnostic consumable intended for operation with the reader 10, will be described. FIGS. 3 to 6 illustrate an example substrate 500 for a diagnostic consumable that includes multiple sensing regions. FIGS. 3 and 4 are isometric views of the substrate 500, and FIGS. 5 and 6 are plan views of the substrate. FIGS. 3 and 5 are views of a top surface 502 of the substrate 500, and FIGS. 4 and 6 are views of a bottom surface 504 of the substrate. The terms "top" and "bottom" are used herein for ease of reference only, and do not require or imply a certain orientation of the substrate 500. Although the substrate 500 could be designed to be operated with the top surface 502 facing vertically upwards and the bottom surface 504 facing vertically downwards, this might not be the case in all implementations. Moreover, the orientation of the top surface 502 and the bottom surface 504 of the substrate 500 could have minimal or no impact on fabrication, storage and/or transportation of the substrate.

The substrate 500 is illustrated as being a rectangular prism that is approximately the size and shape of a credit card, but this is only an example. The substrate 500 could also or instead be other shapes such as triangular or circular, for example. The substrate 500 could be made out of plastics, ceramics, glass and/or metal, for example. The substrate 500 could be a single, unitary body or part. The dimensions of the substrate 500 are not limited to any specific ranges or values. The length and width of the substrate 500 could be considered to define the area of the top surface 502 and the bottom surface 504. In some implementations, the length and/or width of the substrate 500 is on the order of centimeters. In some implementations, the length and/or width of the substrate 500 is on the order of millimeters. Other lengths and/or widths of the substrate 500 are also possible. The thickness of the substrate 500 could be measured as the distance between the top surface 502 and the bottom surface 504 of the substrate. In some implementations, the thickness of the substrate 500 is on the order of centimeters. In some implementations, the thickness of the substrate 500 is on the order of millimeters. In some implementations, the thickness of the substrate 500 is on the order of micrometers. Other thicknesses of the substrate 500 are also possible. Although the top surface 502 and the bottom surface 504 of the substrate 500 are illustrated as being substantially flat, this might not be the case in all embodiments. For example, the top surface and/or the bottom surface of a substrate could also or instead be triangular, conical and/or hemispherical in shape. Accordingly, the thickness of a substrate could vary along its length and/or width. The substrate 500 is illustrated as being transparent, however substrates could also or instead be, in whole or in part, translucent or opaque.

The substrate 500 further includes a sample fluid input port 506, a sample fluid reservoir 508, a fluid reservoir 510, a valve hole 512, two bubble traps 514, 516, another sensing region 518, waste fluid reservoirs 520, 543, multiple delivery system connection ports 522, 523, multiple vias 112, 114, 524, 526, 528, 530, 532, 534, 536, 545, and multiple channels 538, 540, 542, 544, 546, 548, 550, 552, 554, 556, 558, 560, 562. In FIGS. 3 to 6, solid lines are used to illustrate components that are directly in view in each figure, and dashed lines are used to illustrate components that are hidden from view by at least a portion of the substrate 500.

The channels 538, 540, 541, 542, 544, 546, 548, 550, 552, 554, 556, 558, 560, 562 are provided to carry one or more fluids in the substrate 100. The channels 540, 541, 542, 548, 552, 558 are trenches or grooves in the top surface 502 of the substrate 500. The channels 540, 541, 542, 548, 552, 558 are illustrated as being open at the top surface 502 of the substrate 500 in FIGS. 3 and 5. Similarly, the channels 538, 544, 546, 550, 554, 556, 560, 562 are trenches or grooves in the bottom surface 504 of the substrate 500, which are open at the bottom surface of the substrate in FIGS. 4 and 6. Any or all of the channels 538, 540, 541, 542, 544, 546, 548, 550, 552, 554, 556, 558, 560, 562 could be microfluidic channels. For example, the width and/or height of any or all of the channels 538, 540, 541, 542, 544, 546, 548, 550, 552, 554, 556, 558, 560, 562 could be on the order of micrometers. The width and/or height of any or all of the channels 538, 540, 541, 542, 544, 546, 548, 550, 552, 554, 556, 558, 560, 562 could also or instead be on the order of millimeters or centimeters. The cross-sectional area of a channel or other fluidic component is generally measured as an area inside of the channel that is perpendicular to a direction of fluid flow. Although the channels 538, 540, 541, 542, 544, 546, 548, 550, 552, 554, 556, 558, 560, 562 are illustrated with generally rectangular cross-sections in FIGS. 3 to 6, one or more of these channels could have other cross-sectional shapes as well, such as semicircular or triangular, for example.

The vias 112, 114, 524, 526, 528, 530, 532, 534, 536, 545 are through-holes or bores that extend through the substrate 500. Vias could be used to fluidly connect two or more components of the substrate 500. For example, via 112 fluidly connects channel 542 and a sample preparation channel 102, via 114 fluidly connects chamber 110 and channel 541, via 526 fluidly connects channel 538 and channel 540, via 528 fluidly connects channel 540 and channel 544, via 530 fluidly connects channel 552 and channel 554, via 532 fluidly connects channel 548 and channel 556, via 534 fluidly connects channel 546 and channel 548, via 536 fluidly connects channel 560 and the waste fluid reservoir 520, and via 545 fluidly connects channel 562 and the waste fluid reservoir 543. Vias could also or instead be used to fluidly connect a component of the substrate 500 to the top surface 502 and/or bottom surface 504 of the substrate. For example, the via 524 fluidly connects the sample fluid reservoir 508 to the bottom surface 504 of the substrate 500. Although illustrated as circular holes, the vias could also or instead be other shapes such as rectangular or triangular, for example. The diameter of the vias could be similar to the width of one or more of the components that each via connects. For example, the diameter of the via 526 could be similar to the width of the channel 538 and/or the channel 540. However, the diameter of the vias could be different from the width of the components that each via connects.

The sample fluid input port 506 is provided to deliver a blood sample to the substrate 500. The sample input port 506 is a conical or cylindrical opening in the top surface 502 of the substrate 500. The sample input port 506 is coupled to the channel 538. The sample input port 506 could be sized and shaped to engage with an end of a fluid sample delivery device, such as, in the case of a blood sample, a syringe or capillary tube (not shown), that delivers the blood sample. For example, in the case of a syringe, this engagement between the sample input port 506 and the syringe could form a seal such that, when the blood sample is propelled or pumped out of the syringe, the blood sample is forced into the channel 538 and does not spill out of the sample input port. In some embodiments, a gasket component is installed in the sample input port 506 in order to facilitate the sealing engagement with the sample delivery device.

The sample fluid reservoir 508 could be a relatively wide and long channel or chamber that is coupled to the channel 540. The sample fluid reservoir 508 is illustrated with a rectangular cross-section, however other cross-sectional shapes are also possible. The sample fluid reservoir 508 could be provided to store a blood sample after it is delivered into the substrate 500. The via 524 could act as an air vent to allow air to escape the sample fluid reservoir 508 when it is displaced by the addition of blood sample. During operation, the blood sample might stay in the sample fluid reservoir 508 for an amount of time that is on the order of milliseconds, seconds, or minutes, for example.

The fluid reservoir 510 could be a relatively wide and long channel or chamber that is coupled to the channel 550. The fluid reservoir 510 is illustrated as a U-shaped channel with a semicircular cross-section, however other geometries are also possible. In some embodiments, the fluid reservoir 510 could be provided to store a calibration fluid or a wash fluid and/or a fluid pack that seals the calibration fluid or the wash fluid. The fluid pack could be positioned in a shallow depression provided by the fluid pack region 578. In embodiments where the fluid reservoir 510 stores a calibration fluid, the calibration fluid could be used to calibrate one or more sensors included on and/or coupled to the substrate 500. Calibration fluids could include fluids with known concentrations of one or more analytes. These analytes could correspond to analytes in the fluid sample, such as a blood sample, that might be measured using the substrate 500. In embodiments where the fluid reservoir 510 stores a wash fluid, the wash fluid could be used to wash one or more regions of the substrate 500. For example, the wash fluid could be used to wash away unbound components from an antigen-antibody interaction region.

The valve hole 512 could be a via or bore that extends through the thickness of the substrate 500. The channel 550 and the channel 552 could be fluidly connected by the valve hole 512. The valve hole 512 could be sized and shaped to accommodate and/or couple to a valve (not shown). This valve could control the flow of fluid from the channel 550 to the channel 552. When the valve is closed, the flow of fluid between the channel 550 and the channel 552 could be blocked. When the valve is opened, the flow of fluid between the channel 550 and the channel 552 could be permitted. In some implementations, the valve could be closed until a seal in the valve is ruptured, allowing fluid to flow into the channel 552.

The two bubble traps 514, 516 are provided to inhibit the movement of bubbles in the substrate 500. Each bubble that enters either of the bubble traps 514, 516 could be prevented from moving further downstream by one or more barriers in the bubble trap. Thus, the fluid that leaves the bubble traps 514, 516 could be free of air bubbles. The bubble trap 514 fluidly connects the channels 544, 546, and the bubble trap 516 fluidly connects the channels 554, 556.

The sensing region 518 includes a channel that is coupled to the channel 548 and to the channel 558. The sensing region 518 extends through the thickness of the substrate 500, and is therefore illustrated as being open at the top surface 502 and bottom surface 504 of the substrate in FIGS. 3 to 6. The sensing region 518 could include and/or be coupled to one or more sensors that measure properties of fluids in the sensing region. For example, the sensors could measure the concentration of one or more analytes in a fluid that flows from the channel 548 to the channel 558. The sensing region 518 could also or instead be referred to as an assay region.

The waste fluid reservoir 520 is fluidly coupled to the channel 558, and stores fluid that has flowed through the sensing region 518. The waste fluid reservoir 520 is illustrated in FIGS. 3 to 6 as a meandering channel with a rectangular cross-section, however other geometries of the waste fluid reservoir 520 are also possible.

The delivery system connection ports 522, 523 provide a connection to one or more external delivery systems provided in a diagnostic device, such as card reader 10, as discussed further below. The channel 560 is fluidly connected to the connection port 522, and the channel 562 is fluidly connected to the connection port 523.

The optical sensing or assay region 576 provides another sensing functionality to a diagnostic consumable incorporating the substrate 500. The channel 542 fluidly connects the channel 540 to the sample preparation channel 102 through via 112. In the embodiment shown, the sample preparation channel acts as a haemolysis channel 102 to haemolyse a blood sample before it reaches optical sensing region 576. Thus, channel 102 is fluidly connected to a chamber 110 within the optical sensing region 576. The channel 541 fluidly connects the chamber 110 and the waste fluid reservoir 543 through via 545. The channel 562 fluidly connects the waste fluid reservoir 543 to port 523 through via 545. In operation, at least a portion of a fluid sample, such as a blood sample, could be directed through the channel 542, the fluid preparation channel 102 and into the chamber 110 to be optically analyzed in the optical sensing region 576.

Figure 7:
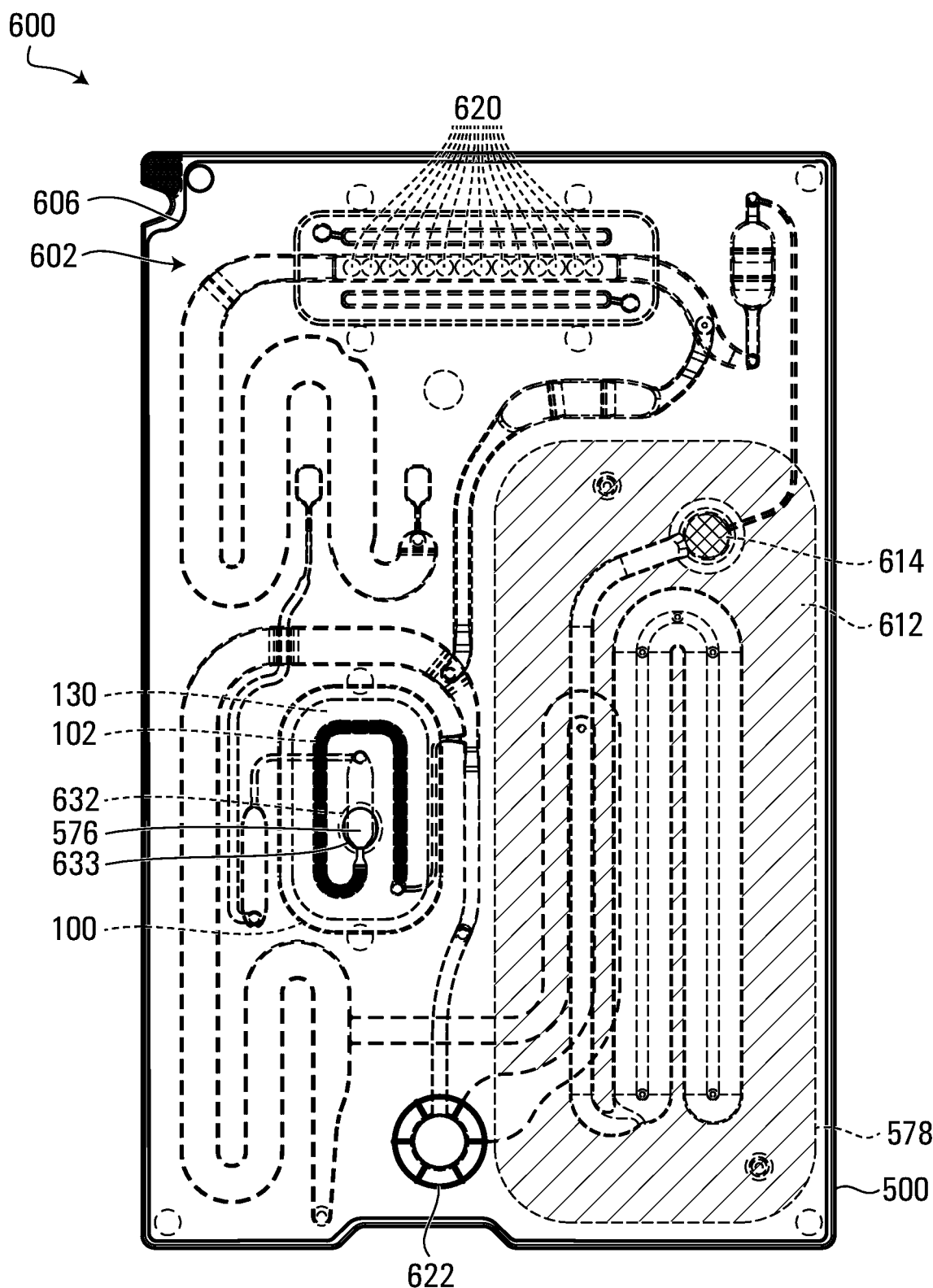
FIG. 7 is a plan view of the top of an example diagnostic consumable incorporating the substrate of FIG. 3.
Figure 8:
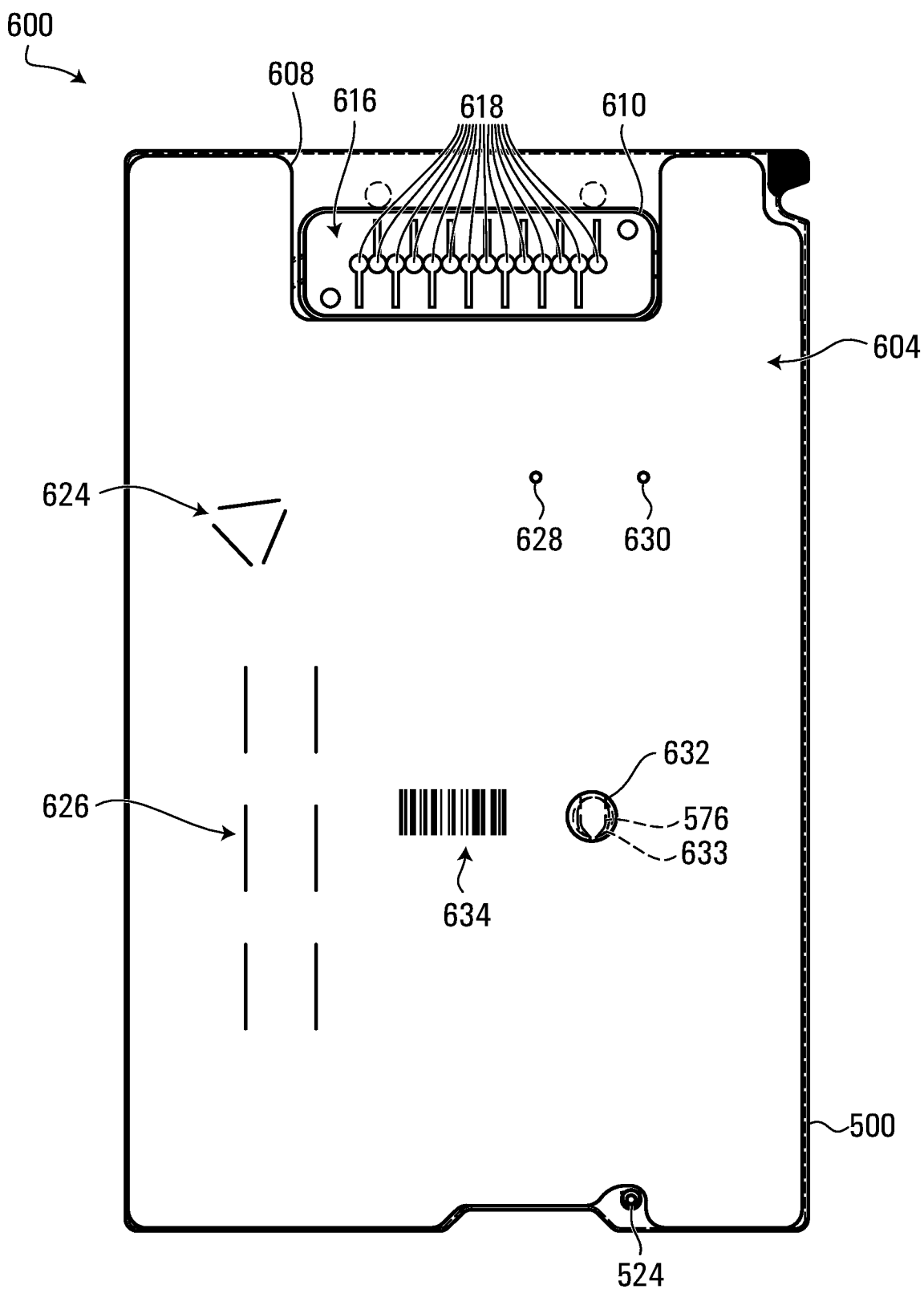
FIG. 8 is a plan view of the bottom of the diagnostic consumable of FIG. 7.

FIGS. 7 and 8 illustrate plan views of an example diagnostic consumable 600 that incorporates the substrate 500 shown in FIGS. 3 to 6. The diagnostic consumable 600 could be considered an assembled diagnostic card or test card for blood analysis and/or testing. In some implementations, the diagnostic consumable 600 is a microfluidic device. The diagnostic consumable 600 could be configured, by being sized and shaped for example, to be received by a diagnostic device, such as card reader 10. FIG. 7 is a view of the top surface 602 of the diagnostic consumable 600, and FIG. 8 is a view of the bottom surface 604 of the diagnostic consumable. In addition to the substrate 500, the device 600 includes the cover layer 130 covering a fluid preparation state 100, such as a haemolysis stage, top cover layer 606, a bottom cover layer 608, a sensor array 610, a calibration fluid pack 612 (illustrated using parallel hatching) and a valve 614 (illustrated using cross-hatching). Many components of the substrate 500 are not labelled in FIGS. 7 and 8 for the purpose of clarity.

At least a portion of the top surface 502 and bottom surface 504 of the substrate 500 are sealed using the top cover layer 606 and the bottom cover layer 608, respectively. The top and bottom cover layers 606, 608 could be impermeable to liquids (and possibly gases) to provide a liquid tight (and possibly gas tight) seal. In some implementations, the top and bottom cover layers 606, 608 could include plastic, metal and/or ceramic films that are bonded to the substrate 500 using an adhesive. For example, in some implementations, the top cover layer 606 and/or the bottom cover layer 608 could be implemented as an adhesive label or sticker. Non-limiting examples of adhesives include acrylic adhesives and silica adhesives. The top and bottom cover layers 606, 608 could form a seal around one or more components of the substrate 600. For example, the top cover layer 606 could seal, at least in part, the sample fluid reservoir 508, the bubble traps 514, 516, the sensing region 518, the waste fluid reservoir 520 and the channels 540, 541, 542, 548, 552, 558. The bottom cover layer 608 could seal, at least in part, the sample input port 506, the calibration fluid reservoir 510, the bubble traps 514, 516 and the channels 538, 544, 546, 550, 554, 556, 560, 562. The top cover layer 606 is illustrated as being substantially transparent and the bottom cover layer 608 is illustrated as being substantially opaque, but this is only an example. In general, either or both of the top cover layer 606 and the bottom cover layer 608 could be transparent, translucent, opaque, or a combination thereof. In FIG. 7, dashed lines are used to illustrate components that are under the top cover layer 606.

In this example, the sensor array 610, which could also be referred to as an electrode module, is bonded to the bottom surface 504 of the substrate 500. The sensor array 610 overlaps and seals at least a portion of the sensing region 518. The bottom cover layer 608 does not overlap the sensor array 610. The sensor array 610 could be fabricated using smart-card chip-module technology. In this example, the sensor array 610 includes a gold coated copper metal foil laminated to an epoxy foil element 616 with an optional adhesive. The metal foil is formed into an array of electrode elements 618. Each electrode element 618 could have a connection end for forming an electrical connection to a measuring circuit in a card reader module, for example. The connection ends of the electrode elements 618 are not labelled for reasons of clarity. Multiple sensors 620 are coupled to the electrode elements 618. Each of the sensors 620 are positioned over the sensing region 518 of the substrate 500. In use, the sensors 620 could be used to measure one or more properties of a calibration fluid and/or sample fluid in the sensing region 518. The sensors 620 could be electrochemical sensors that are used for measuring concentrations of gases, electrolytes and/or metabolites. The sensors 620 could include potentiometric sensors to measure sodium, potassium, ionized calcium, chloride, urea, $TCO_2$, pH levels and/or $CO_2$ partial pressure; amperometric sensors to measure $O_2$ partial pressure, glucose, creatinine and/or lactate; and/or conductometric sensors to measure hematocrit, for example. The number and geometry of the electrodes 618 and the sensors 620 is provided by way of example only. The same module fabrication technology can be used to make sensor arrays with many different electrode/sensor numbers and geometries.

The calibration fluid pack 612 is sandwiched between the calibration fluid pack region 578 of the substrate 500 and the bottom cover layer 608. The calibration fluid pack 612 could fill the calibration fluid reservoir 510 and the channel 550. The calibration fluid pack 612 could be provided to seal and store a calibration fluid, in order to improve the stability of the calibration fluid over time. For example, the calibration fluid pack 612 could inhibit gases, such as carbon dioxide, from permeating into and/or out of the calibration fluid.

The top surface 502 of the substrate 500 is substantially sealed by the top cover layer 606, with the exception of a hole 622 that corresponds to the location of the sample input port 506. The hole 622 allows a blood sample delivery device, such as a syringe or capillary tube, to be coupled to the sample input port 506 to deliver a blood sample into the diagnostic consumable 600. In addition, the top cover layer 606 also includes a second hole 633 that corresponds to the location of the optical sensing region 576. As discussed earlier, the sample input port 506 may include a gasket component that facilitates a sealing engagement between the sample input port 506 and the sample delivery device. For example, the gasket component may be a rubber or silicone component installed in the sample input port 506 and sized and shaped to sealingly engage a sample delivery device.

The bottom surface 504 of the substrate 500 is substantially covered by the bottom cover layer 608, with the exception that the sensor array 610 and the via 524 are not sealed by the bottom cover layer. The bottom cover layer 608 includes cuts or scoring 624, 626. The scoring 624, 626 could be provided to render the bottom cover layer 608 more malleable and workable in the area proximate the scoring. The position of the scoring 624 corresponds to the position of the valve 614. The scoring 624 could make the portion of the bottom cover layer 608 that is adjacent to the valve 614 more flexible, and could therefore permit the valve to be manipulated more easily. The position of the scoring 626 corresponds to the position of the calibration fluid reservoir 510. The scoring 626 could make the portion of the bottom cover layer 608 adjacent to the calibration fluid reservoir 510 more flexible, and therefore permit the calibration fluid pack 612 to be manipulated more easily.

The bottom cover layer 608 also includes holes 628, 630 corresponding to the location of the delivery system connection ports 522, 523 on the substrate 500. The connection ports 522, 523 could be connected to a delivery system in a diagnostic device, such as the card reader 10, through the holes 628, 630. The holes 628, 630 could be sized and shaped to form a seal between the delivery system and the connection ports 522, 523.

The bottom cover layer 608 includes a hole 632 corresponding to the optical sensing region 176 and generally aligned with the hole 633 in the top cover layer 606. The holes 632, 633 and the transparency of the substrate 500 and the cover layer 130 in the area of the optical sensing region 576 facilitate optical sensing within the optical sensing region.

In this example, a 1D barcode 634 is printed on the bottom cover layer 608. The barcode 634 could be read by a diagnostic device, such as the card reader 10, when the diagnostic consumable 600 is inserted into the card reader 10. The barcode 634 could authenticate the diagnostic consumable 600 and/or provide information regarding the diagnostic consumable. For example, the barcode 634 could indicate the date that the diagnostic consumable 600 was manufactured. The barcode 634 is one example of a machine-readable code that could be present on the bottom cover layer 608 or elsewhere on the diagnostic consumable. Other examples of machine-readable codes include 2D barcodes. Radio-frequency identification (RFID) chips or tags could also or instead be used.

Referring to FIGS. 9 to 21, embodiments of a delivery system will now be described. As discussed above, the delivery system may be configured and arranged in a diagnostic device, such as the reader 10, to operatively connect to the diagnostic consumable 600 for delivering a fluid sample through a channel of the diagnostic consumable. Thus, for example, a fluid sample, such as a blood sample, may be delivered to a desired or predetermined location in the diagnostic consumable 600, for example sensing region 518 and/or optical sensing region 576.

The delivery system will be described primarily in terms of a vacuum pressure delivery system, meaning that the fluid sample is delivered through the channel of the diagnostic consumable via the application of vacuum pressure pulses downstream of the fluid sample. However, the principles of the present disclosure include and may also be applied to delivery systems and methods for delivering the fluid sample using positive pressure pulses, meaning that the fluid sample is delivered through the channel of the diagnostic consumable via the application of positive pressure pulses upstream of the fluid sample.

Figure 9:
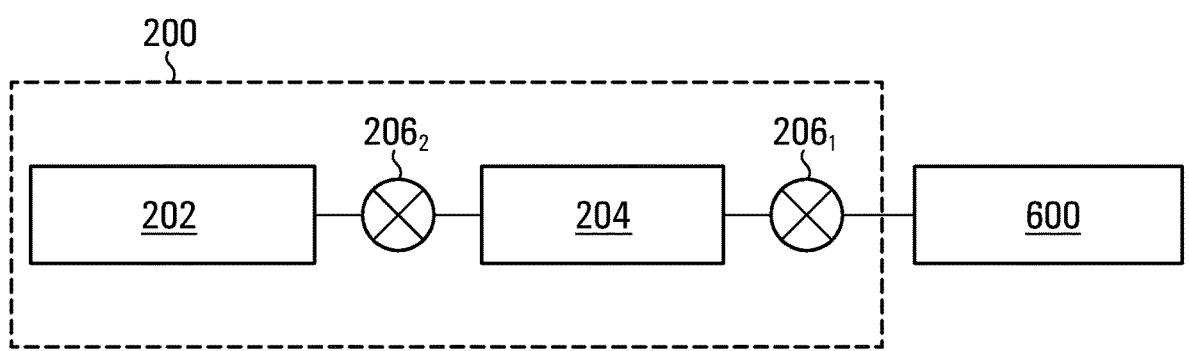
FIG. 9 is a schematic view of a delivery system according to one embodiment of the present disclosure.

As shown schematically in FIG. 9, in some embodiments, the delivery system 200 includes a vacuum source 202, a charge vessel 204 fluidly connected to the vacuum source 202 upstream of the vacuum source 202, a first valve $206_1$ immediately upstream of the charge vessel 204, and a second valve $206_2$ immediately downstream of the charge vessel 204. The delivery system 200 is in turn fluidly connected downstream of the diagnostic consumable 600. The components of the delivery system 200 are fluidly connected to each other in any manner suitable for that purpose.

It is noted that the terms "upstream" and "downstream" are relative terms chosen with respect to the travel direction of the fluid sample through the channel. "Downstream" is considered to be in the direction of travel of the fluid sample, while "upstream" is considered to be against the direction of travel of the fluid sample. However, the use of "upstream" and "downstream" can be reversed without departing from the principles of the present disclosure. Similarly, the terms may be reversed when considering embodiments where the delivery system is connected to the channel upstream of the fluid sample and positive pressure pulses are applied.

The first and second valves $206_1$, $206_2$ are operable to open and close at a predetermined frequency to alternatively charge and discharge the charge vessel 204, thereby applying vacuum pressure pulses to a channel of the diagnostic consumable 600.

In particular, in each cycle, the second valve $206_2$ opens while the first valve $206_1$ remains closed, thereby fluidly connecting the charge vessel 204 to the vacuum source 202. The charge vessel 204 is thereby pressurized to the vacuum pressure of the vacuum source 202. The second valve $206_2$ then closes and the first valve $206_1$ opens, fluidly connecting the charge vessel 204 with the channel of the diagnostic consumable that initially contains air at ambient pressure downstream of the fluid sample. In effect, the pressurized charge vessel 204 acts to generate a vacuum downstream of the fluid sample. The vacuum pressure is thereby applied to the channel. However, notably, the vacuum pressure is not constant, since the first valve $206_1$ closes and the second valve $206_2$ opens to repeat the cycle. Additionally, in-between cycles, movement of the sample causes the vacuum to decay (FIG. 11B). In this manner, the delivery system 200 applies vacuum pressure pulses to the channel of the diagnostic consumable 600. The work being done by the pressure pulses is a function of the pressure of the pressure pulses and the volume of the charge vessel 204. As noted above, it will be understood that the system of FIG. 9 may also be used to deliver the sample using positive pressure pulses.

Figure 10:
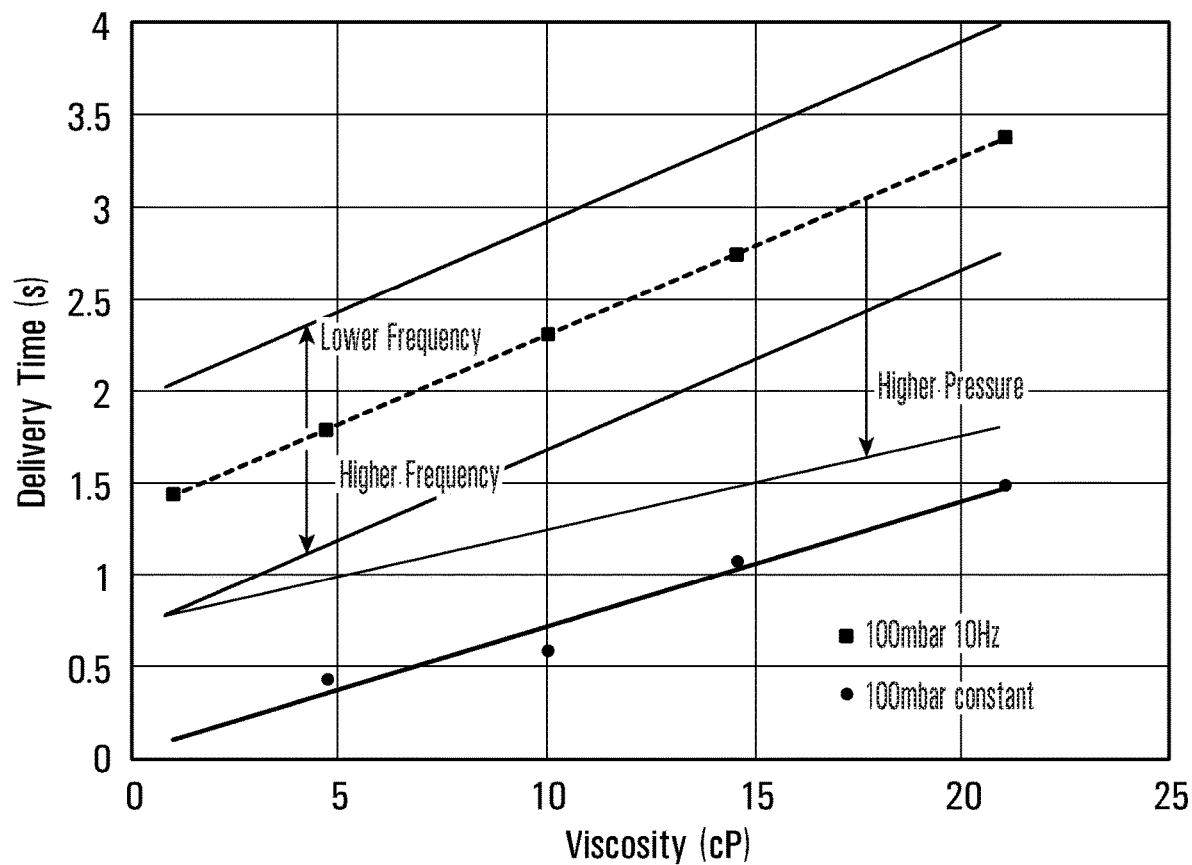
FIG. 10 is a plot of time of delivery as a function of viscosity for two different delivery system configurations, which also shows the general effect on time of delivery of changing reservoir pressure and capacitor discharge frequency.

Referring to FIG. 10, according to embodiments of the present disclosure, a range of delivery times can be relatively narrow: comparable to a delivery system at the same source pressure but without a charge vessel, without necessitating very fast delivery for low-viscosity samples (where stopping the sample accurately can be difficult at high speed).

In delivery systems with a charge vessel, increasing the magnitude of the source vessel pressure while keeping the discharge frequency of the charge vessel constant, reduces the range of delivery times (and vice versa), as does increasing the magnitude of pressure of a constant-pressure source. This is indicated by the arrow labelled "Higher Pressure" showing a reduced slope from dotted line to solid line.

However, unlike the constant-pressure source, the range of delivery times may be translated up or down by changing a switching (i.e. discharge) frequency of the charge vessel. This is indicated by the arrows labelled "Lower Frequency" and "Higher Frequency" showing the translation of the dotted line up or down to parallel solid lines. Again, this may prevent undesirably fast delivery. Depending on the fluid sample to be delivered, a user might predetermine the combination of pressure and charge vessel cycle frequency to also prevent undesirably slow delivery.

Figure 11A:
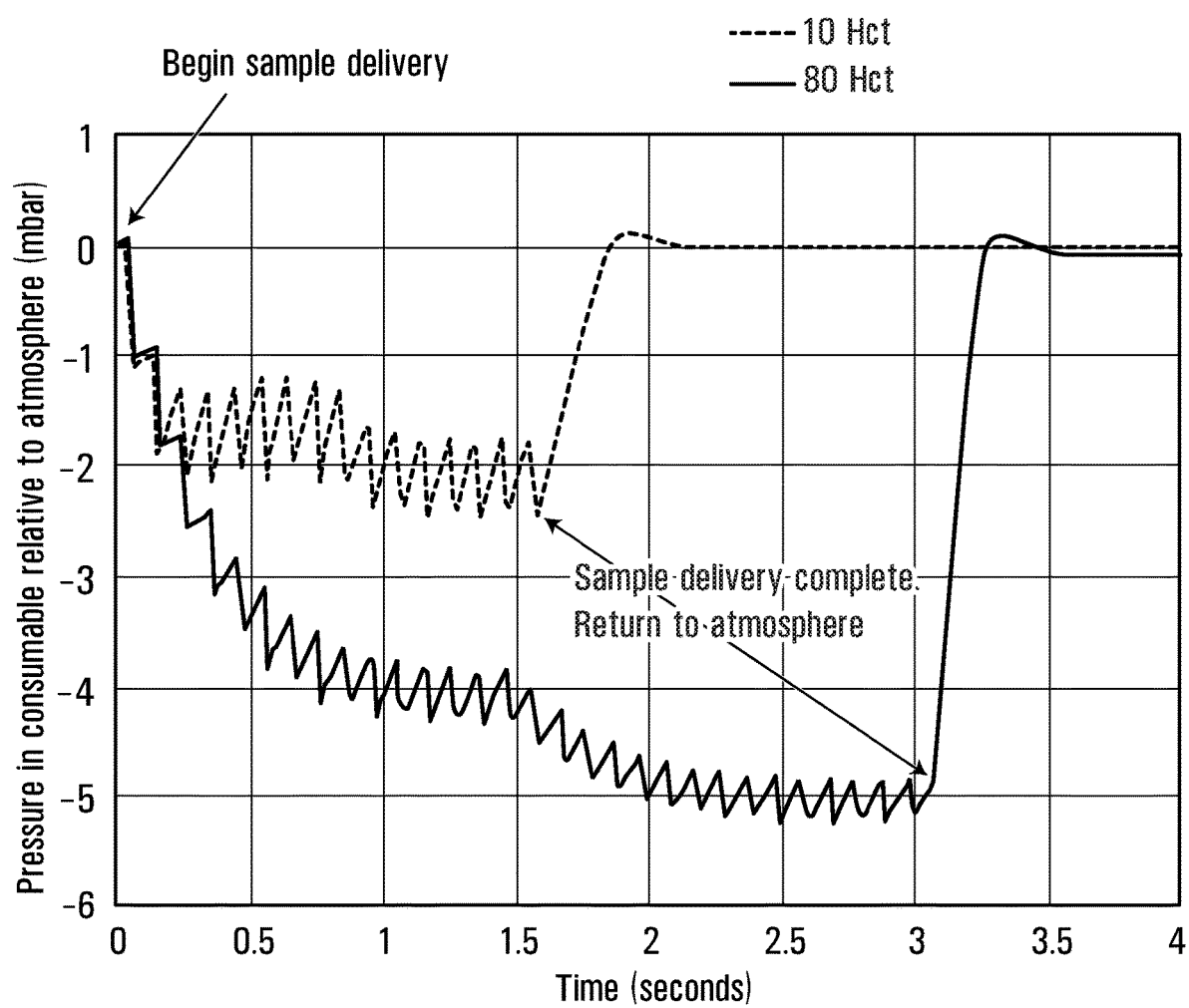
FIG. 11A is a plot of pressure within the consumable relative to atmosphere as a function of delivery time according to embodiments of the present disclosure.
Figure 11B:
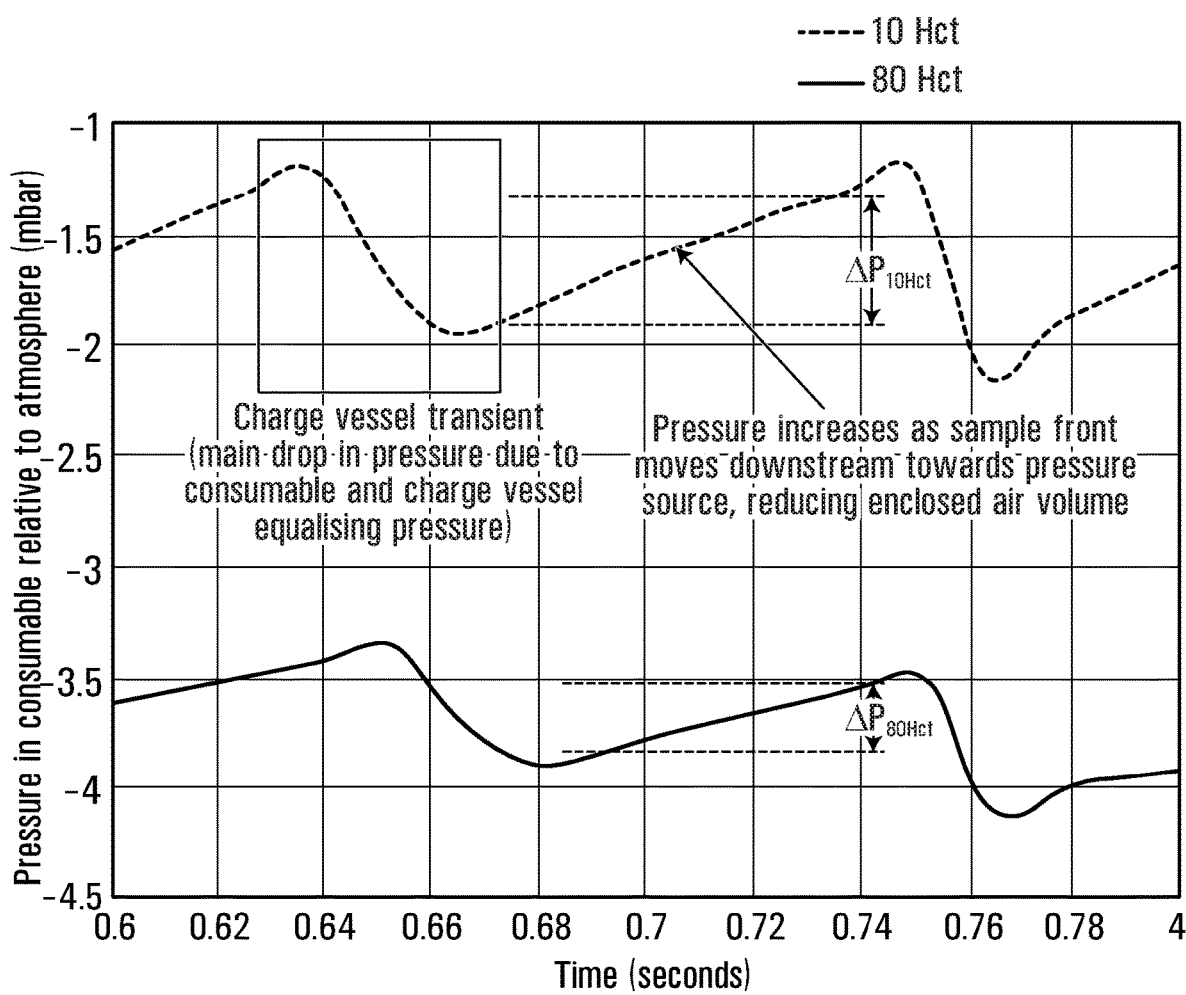
FIG. 11B is a magnification of a portion of the plot in FIG. 11A.

Referring to FIG. 11A, one example is shown. In this example, a delivery system with the following pumping variables were used:
- 10 mL volume for vacuum source, set to initial pressure of −100 mbar (i.e. sample pulled by vacuum pressure)
- 100 μL volume for charge vessel
- 10 Hz frequency cycle for charging and discharging charge vessel
- Samples of 10 and 80 Haematocrit (Hct), which correlates with viscosity, were delivered the same distance
- Pressure measured in the volume between charge vessel and sample As can be seen by the plots of pressure vs. delivery time, the average driving pressure increases in magnitude with the more viscous sample (to −5 mbar for 80 Hct vs. −2 mbar for 10 Hct). This effect, discussed below in reference to FIG. 11B, aids in reducing the range of delivery times, i.e. more viscous samples experience more driving pressure than less viscous samples.

Referring to FIG. 11B, it can be seen that between charge vessel transients, the change in pressure is related to the change in volume between the charge vessel and the fluid sample front (i.e. the volume in which the pressure is being measured).

According to the ideal gas law, an increase in pressure is proportional to a volume decrease, and vice versa. Thus, as can be seen, $\Delta P_{10Hct}$ is almost double $\Delta P_{80Hct}$. Accordingly, between pressure pulses from the charge vessel, the 10 Hct sample moves almost twice as far as the 80 Hct sample. While this may not be the case of every pressure pulse, it is the case for most, particularly for the time range shown in FIG. 11B.

Thus, a consequence of the smaller pressure increase for the more viscous sample is that the average driving pressure increases in magnitude over time of sample delivery. The magnitude of driving pressure for all samples will also increase through points of higher resistance, and as larger volumes of sample are delivered, increasing drag.

Moreover, if the channel geometry within the consumable remains constant, the total decrease in volume between the charge vessel and sample fluid front (i.e. the volume traversed by the sample fluid front) may be estimated at any point by summing the pressure differences, ΔP, between all previous charge vessel transients. For example, the volume traversed by the 10 Hct sample from beginning to end of sample delivery may be estimated as: Volume traversed$_{10Hct}$=Σ (ΔP$_{10Hct}$). This is true for all samples, from the least to most viscous (for example, water to 80 Hct blood). As both samples shown FIGS. 11A and 11B were delivered to the same point in the consumable, Σ (ΔP$_{10Hct}$)= E (ΔP$_{80Hct}$) for the entirety of each respective pressure trace (see FIG. 11C). The sample fluid flow front may be monitored, and stopped at a location of choice, by knowing the association between distance travelled and volume traversed for the consumable of interest.

Accordingly, in general, repeated application of pressure pulses pressurizes the channel of the fluid sample incrementally in steps or bursts as compared to a constantly applied pressure. Doing so counters the effect of viscous drag experienced by the fluid sample in the channel, as seen in FIG. 11A.

Furthermore, summing the pressure changes due to sample movement (e.g. Σ(ΔP$_{10Hct}$) as shown in FIG. 11B) at any point during sample delivery (i.e. along the 10 Hct trace in FIG. 11A) allows one to determine the relative position of the sample flow front at that point, as the pressure change is due to sample movement. This may allow the delivery system to be used to deliver a sample to a particular location along a channel without sensors for direct detection of the fluid flow front.

Figure 11C:
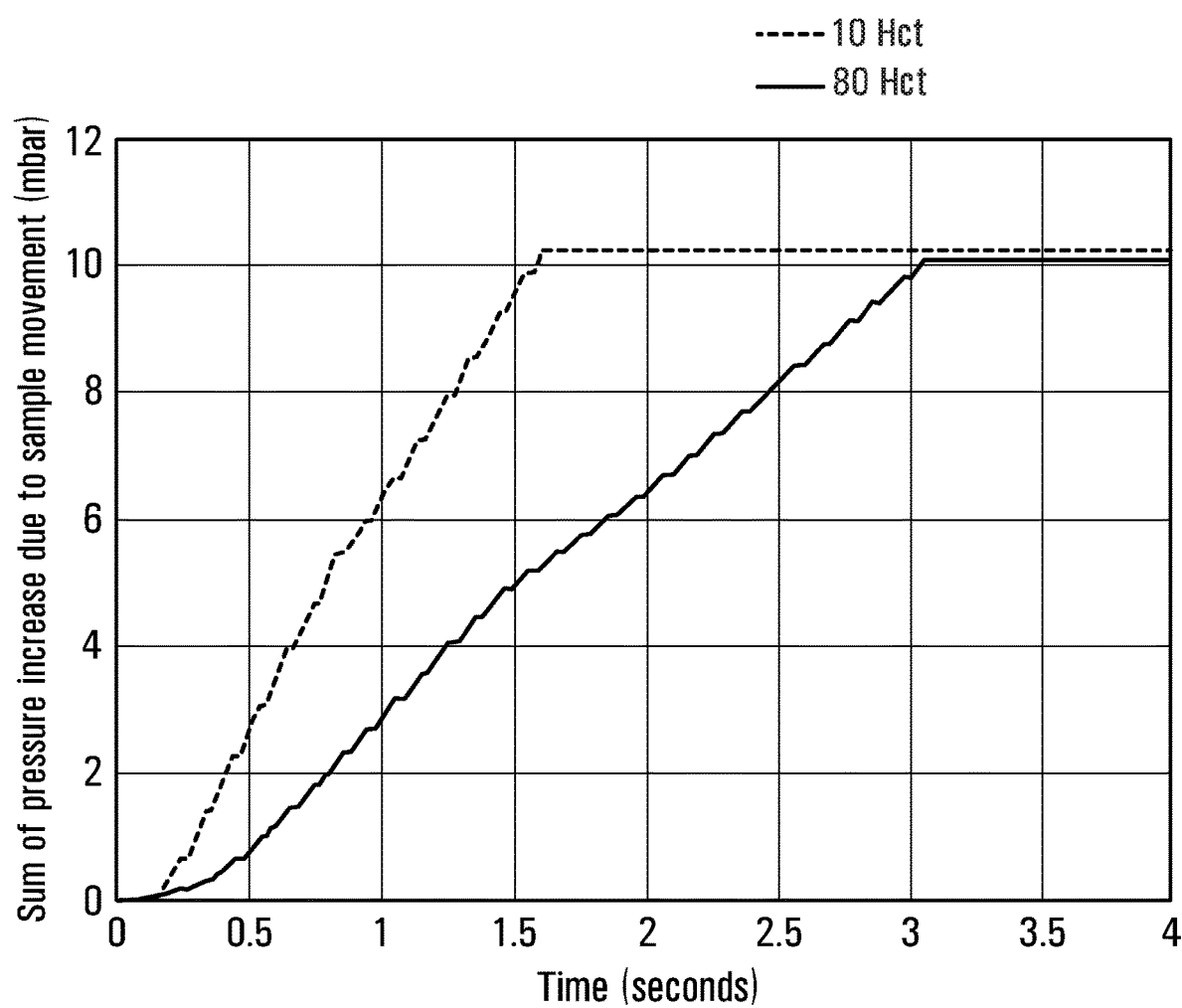
FIG. 11C is a plot showing summation of pressure increases due to sample movement as a function of delivery time according to embodiments of the present disclosure.

For example, as seen in FIG. 11C, two samples (10 Hct and 80 Hct) were moved through a channel, starting and stopping at the same point. The pressure signals used were those shown in FIG. 11B. The positions were calculated and controlled using the summation of pressure increases.

Moreover, to deliver samples of different viscosity to a predetermined location, such as the sensing region 518, at approximately the same time without changing the vacuum source pressure, one could alter the discharge frequency of the charge vessel during delivery—reducing it for less-viscous samples and increasing it for more-viscous ones— based on an initial viscosity estimate or a measurement of the time elapsed vs distance travelled in the channel (calculated as above).

Figure 12:
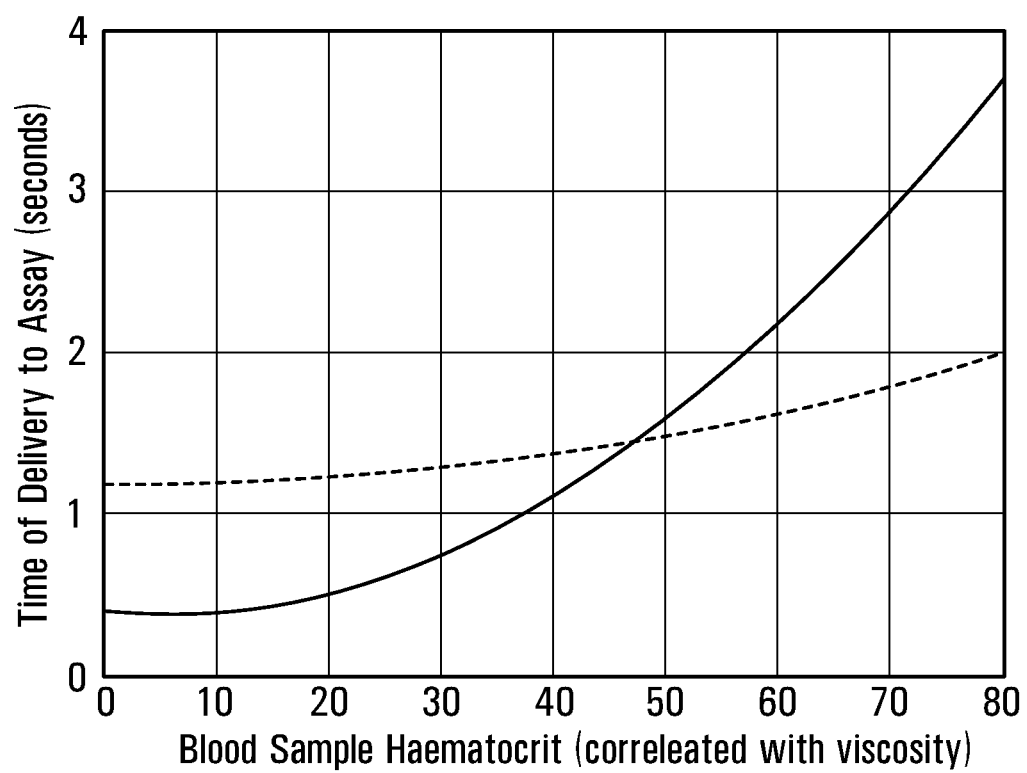
FIG. 12 is a plot of time of delivery as a function of blood sample haematocrit for one embodiment according to the present disclosure.

FIG. 12 shows a plot of experimental data comparing delivery of blood samples to sensing region 518 of the consumable discussed above using an embodiment of a delivery system 200 according to the present disclosure (dotted line) and a constant pressure system (solid line). The delivery system according to embodiments of the present disclosure used a 100 μL charge vessel set to a discharge frequency of 10 Hz and a 10 mL source vessel set to 150 mbar pressure. The plot shows time of delivery of the blood sample to sensing region 518 as a function of the blood sample haematocrit (Hct). As discussed above, when the pressure acting on the sample is incrementally increased by charging and discharging the charge vessel, the sample delivery time is less dependent on viscosity (or haematocrit) compared to a constant-pressure system (solid line). Here the range of delivery times is reduced by approximately 80%. Moreover, the delivery times vary approximately linearly across the range of sample viscosities (it may be exactly linear with respect to viscosity, as shown in FIG. 10B, and approximately linear with respect to Hct as Hct is not linearly related to viscosity), simplifying any delivery-time compensation in measured analyte concentrations that may be performed by a processor of the diagnostic device evaluating signals produced by, for example, the sensor array 610. It may also be beneficial that the low-viscosity samples, which in some implementations are aqueous quality-control solutions, are effectively slowed by the delivery system 200, since overly-rapid sample delivery can cause a number of problems including undesirable bubble formation and wasting of sample due to assay region overshoot, resulting from time-lag in stopping sample (by venting to atmosphere).

While the above-noted advantages of embodiments according to the present disclosure may be achieved with a variety of volumes chosen for the source and charge vessels, the source vessel should be relatively large in volume relative to the volume between the charge vessel and the sample front. If the source vessel volume is insufficiently large, the driving pressure may decay to a point where sample delivery is unacceptably slow.

Figure 13:
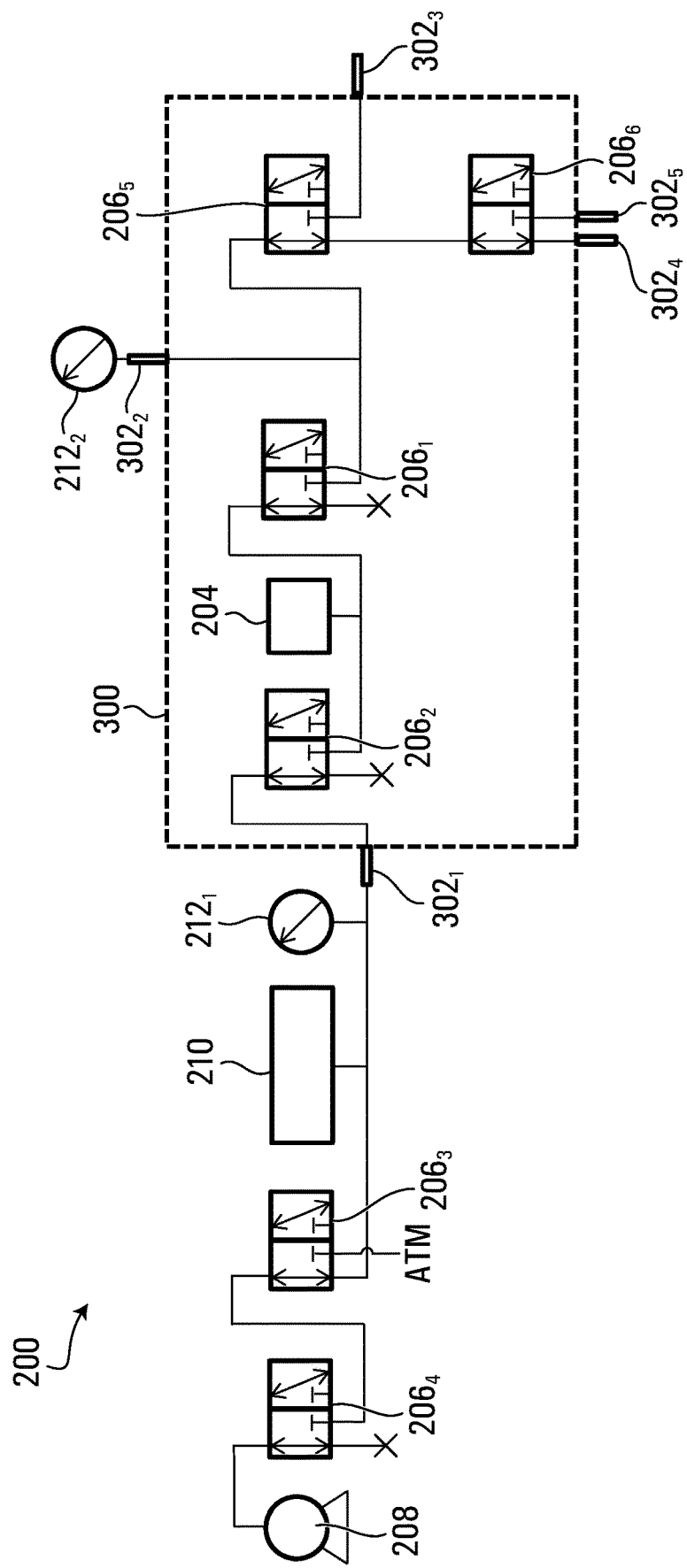
FIG. 13 is a schematic view of a delivery system according to one embodiment of the present disclosure.

FIG. 13 is a schematic diagram showing another embodiment of a delivery system 200 according to the present disclosure. The delivery system 200 includes a vacuum pump 208 as the vacuum source and a source vessel 210 fluidly connected to the vacuum pump 208 and charge vessel 204 between the vacuum pump 208 and the charge vessel 204.

In the illustrated embodiment, the source vessel 210 acts as an intermediary source of vacuum pressure and is pressurized by the vacuum pump. Once the desired vacuum pressure is reached, as measured by a pressure gauge 212$_1$, the source vessel 210 is fluidly connected to the charge vessel 204 to pressurize the charge vessel 204. In some embodiments, the source vessel 210 has a volume larger than a volume of the charge vessel 204. For example, the source vessel 210 may have a volume of 10 mL and the charge vessel 204 a volume of 100 μL. However, the source vessel 210 and charge vessel 204 may be dimensioned differently. In particular, the charge vessel 204 may be dimensioned in dependence on the viscosity range of the fluid samples to be delivered.

Third and fourth valves 206$_3$, 206$_4$ are operable to control the pressurizing of the source vessel 210. When the source vessel 210 is to be pressurized by the vacuum pump, the third valve 206$_3$ is in an unactuated state while the fourth valve 206$_4$ is actuated. The second valve 206$_2$ remains closed. Vacuum pump 208 may be a DC-powered pump (e.g. a diaphragm pump or peristaltic pump). In some embodiments, vacuum pump 208 may be a piezoelectric pump, which can typically operate at voltages higher than a DC-powered pump. The pump 208 may generate a vacuum pressure above that which is intended for source vessel 210. Accordingly, the source vessel 210 is pressurized until only a desired vacuum pressure is reached, as measured by the first gauge 212$_1$. The third valve 206$_3$ remains unactuated once the desired vacuum pressure is reached in the source vessel 210. When unactuated, the fourth valve 206$_4$ remains closed to isolate the vacuum pump 208 from the remainder of the delivery system 200 and, in particular, the source vessel 210. In the event that the source vessel 210 was pressurized to a greater extent than intended or desired, the third valve 206$_3$ is actuated to be temporarily opened to the atmosphere and "bleed" air until the source vessel 210 is returned to the desired pressure set point.

Charging and discharging of the charge vessel 204 may occur as follows: Once the source vessel 210 is at the desired vacuum pressure, the second valve $206_2$ is opened to charge the charge vessel 204. The second valve $206_2$ is then closed. Next, the first valve $206_1$ is opened to expose the channel of the consumable to the incremental pressure charge (i.e. pulse) of the charge vessel 204. The first valve $206_1$ is then closed, followed by an opening of the second valve $206_2$ to recharge the charge vessel 204. These steps are repeated to charge and discharge the charge vessel 204 at the predetermined frequency.

In some embodiments, the charge vessel 204 may be either or both partially charged and discharged if the first and second vales $206_1$ and $206_2$ are switched fast enough. This may add another degree of freedom of control beyond merely increasing the source pressure, altering the source and charge vessel volumes, and altering the discharge frequency.

The illustrated embodiment of the delivery system 200 also includes fifth and sixth valves $206_5$, $206_6$. The fifth valve $206_5$ acts as a bypass valve and is opened to atmosphere if it is desired to stop motion of the fluid sample. Otherwise, the fifth valve $206_5$ allows the vacuum pressures pulses to pass through. The sixth valve $206_6$ acts as a selection valve and allows the delivery system to selectively apply the pressure pulses to a desired channel of the diagnostic consumable (connected to either of the ports $302_4$ or $302_5$). Thus, as will be discussed below, if the delivery system is fluidly connected to ports 522, 523, the sixth valve may be used to direct the vacuum pressure pulses into one of these two ports, thereby moving a fluid through channels leading to sensing region 518 (i.e. the BGEM sensor) or to the optical sensing region 576 (e.g. the COOX sensor).

A second pressure gauge $212_2$ may be used to track pressure in the channel of the diagnostic consumable 600, which may aid in the above-described pressure-feedback fluid delivery and position prediction.

Components of the delivery system 200, including the charge vessel 204, and the first, second, fifth and sixth valves $206_1$, $206_2$, $206_5$ and $206_6$ may be connected to and/or embodied in a manifold 300. The presence of a manifold 300 may aid in manufacturing and/or assembly of the delivery system 200, as well as arranging the components in the reader 10 in a manner that is both space and energy efficient.

In the illustrated embodiment, the manifold 300 includes a first manifold port $302_1$ that fluidly connects the manifold to the remainder of the delivery system 200, a second manifold port $302_2$ that fluidly connects the manifold to the second pressure gauge $212_2$, a third port $302_3$ open to atmosphere, a fourth port $302_4$ to connect to sensing region 518 (i.e. the BGEM sensor) of the consumable, and a fifth port $302_5$ to connect to a the optical sensing region 576 (i.e. the COOX sensor) of the consumable, both of which will be discussed further below.

Figure 14:
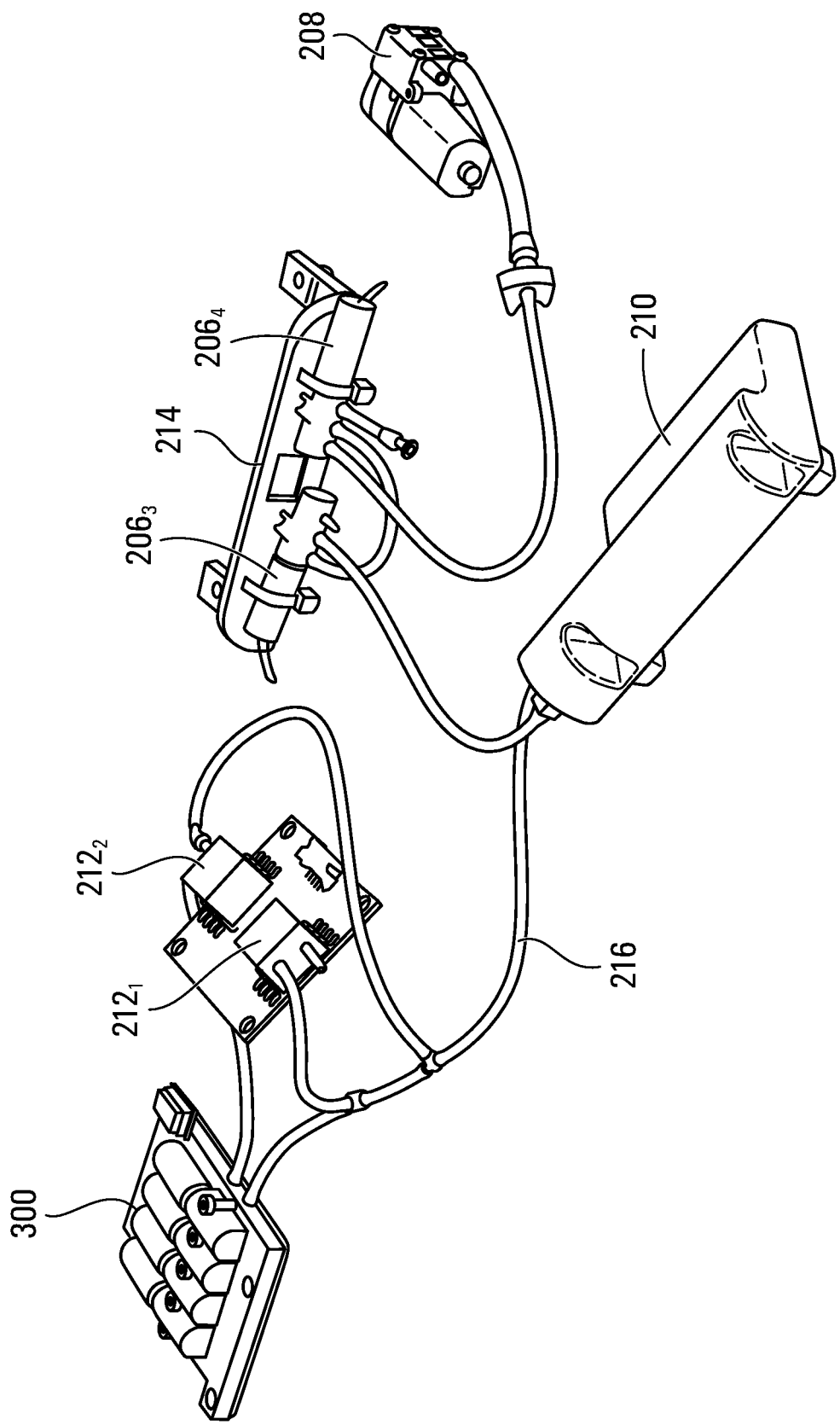
FIG. 14 is a photograph of components of a delivery system according to one embodiment of the present disclosure.

FIG. 14 shows components of the delivery system 200 as per the embodiment shown schematically in FIG. 13. The components are shown in isolation and not necessarily in the relative arrangement they would be in when incorporated into the reader 10. The vacuum source 208 shown in the illustrated embodiment is an off-the-shelf diaphragm pump. In the illustrated embodiment, the vacuum source 208, such as the diaphragm pump, need not be precisely controlled or need not be a source capable of producing a wide, yet precise, spectrum of vacuum pressures because the vacuum source 208 is used to pressurize the source vessel 210, which is in turn set to a precise vacuum pressure by measuring pressure at the first gauge $212_1$ and cycling the third valve $206_3$.

The illustrated shape of the components in FIG. 14 is exemplary only. For example, the source vessel 210 may be shaped as desired or required in order to fit compactly around other components of the reader 10, while still maintaining the desired volume (e.g. 10 mL in one embodiment). Furthermore, while first, second, fifth and sixth valves $206_1$, $206_2$, $206_5$, $206_6$ are mounted onto the manifold 300, third and fourth valves $206_3$, $206_4$ are shown as mounted onto a mounting bracket 214 that may be mounted within the reader 10. Fluid connections between components of the delivery system 200 are established with tubing 216.

Figure 15:
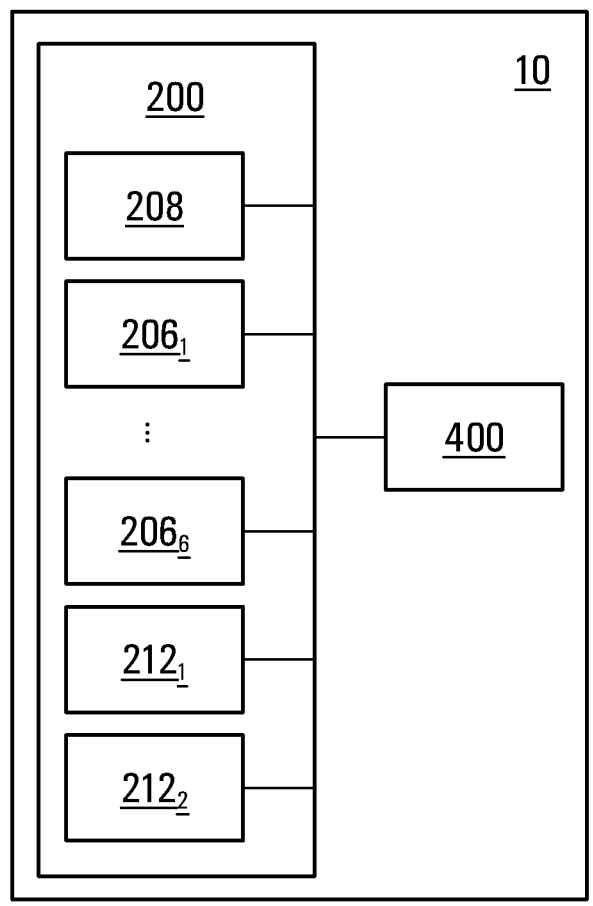
FIG. 15 is a schematic view of a control system of a reader according to one embodiment of the present disclosure.

As shown schematically in FIG. 15, in some embodiments, the card reader 10 includes a controller 400. The controller may be operatively connected to one or more of the vacuum source 208, each of the valves 206, and each of the pressure gauges 212 in order to control these components of the delivery system 200. For example, the controller 400 may act as a vacuum controller configured to open and close the first and second valves $206_1$, $206_2$ at the predetermined frequency. Similarly, the vacuum controller may be configured to vary the predetermined frequency of the vacuum pressure pulses in dependence on the viscosity of the fluid sample, as discussed above, to aid in ensuring that samples with different viscosity travel substantially the same distance through the channel in substantially the same time. The vacuum controller may also be configured to control the vacuum pressure provided by the vacuum source 208, such as the vacuum pump.

The controller may be a logic controller or processing unit such as Programmable Logic Controller (PLC) or other control device, whether electronic and/or mechanical, that achieves the desired functionality. The controller 400 may be pre-programmed and/or receive instructions from a processing unit, such as a central processing unit (CPU), embedded in the reader 10. Alternatively, or in addition, the controller may receive instructions from an external control device, such as a mobile device, that is used to operate the reader 10 and, in some embodiments, also display the output of the diagnostic.

The valves used in the delivery system 200 may be of any suitable type. In some embodiments, the valves are solenoid-type valves with opening/closing times on the order of <5 milliseconds.

As discussed above, the diagnostic consumable 600 may be inserted into reader 10 in order to run a diagnostic test on a fluid sample. Upon insertion, the delivery system 200 is operatively connected to the diagnostic consumable 600 to deliver the fluid sample that will be or has been provided through, for example, the input port 506.

Figure 16:
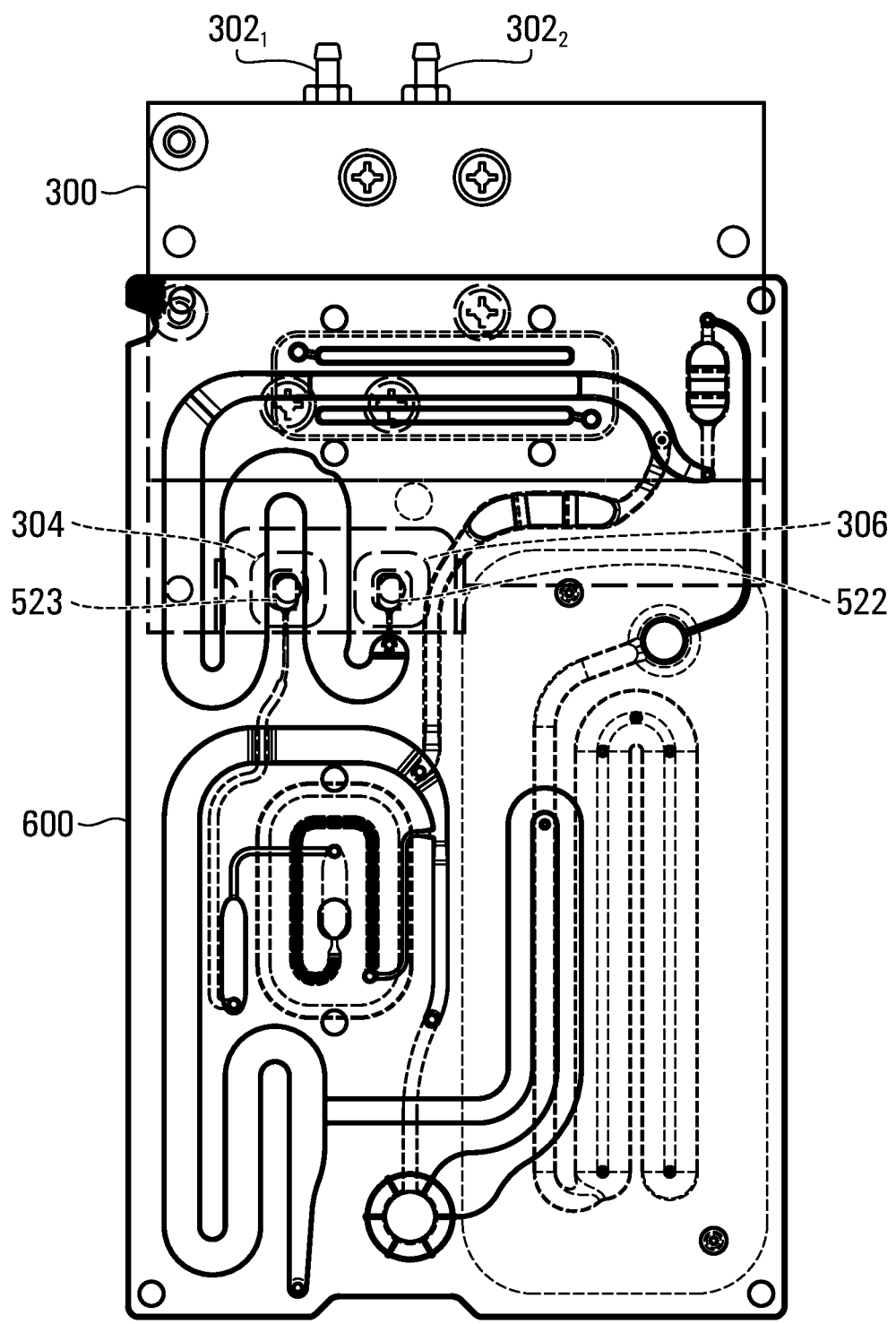
FIG. 16 is a top view of the relative positioning of a diagnostic consumable and a manifold of a delivery system according to one embodiment of the present disclosure.
Figure 17:
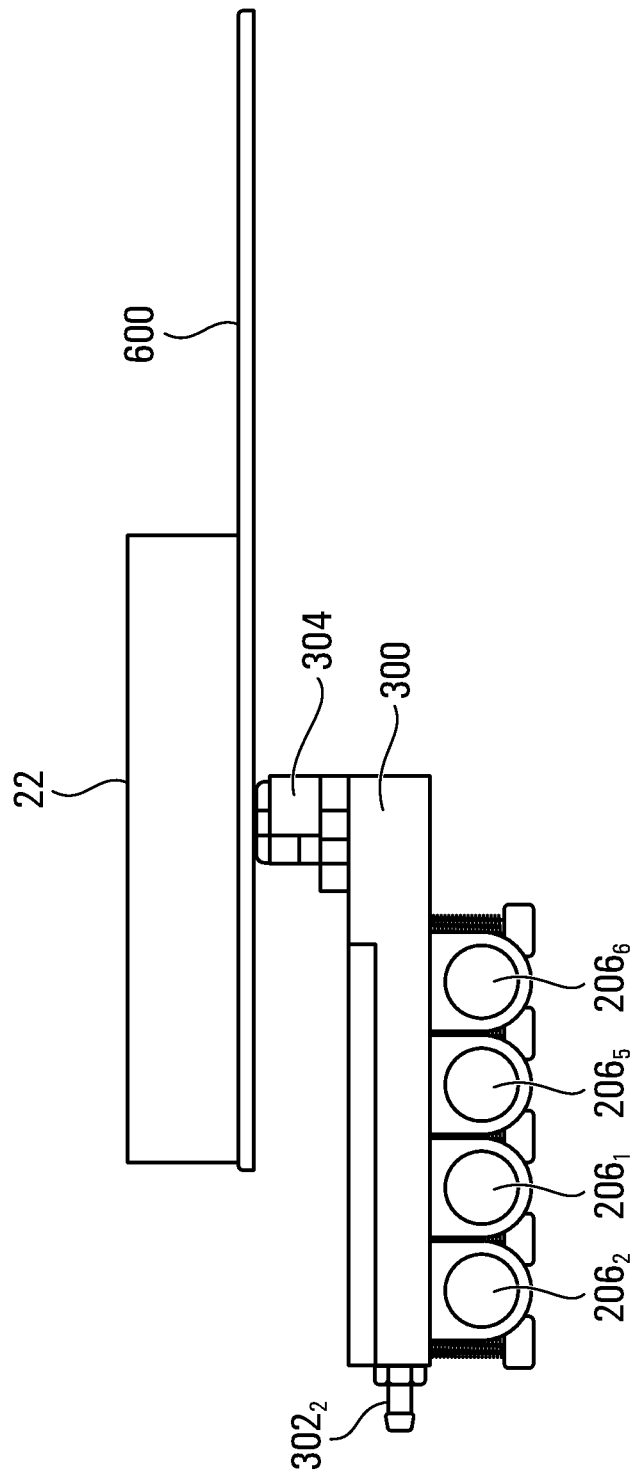
FIG. 17 is a side view of FIG. 16.
Figure 18:
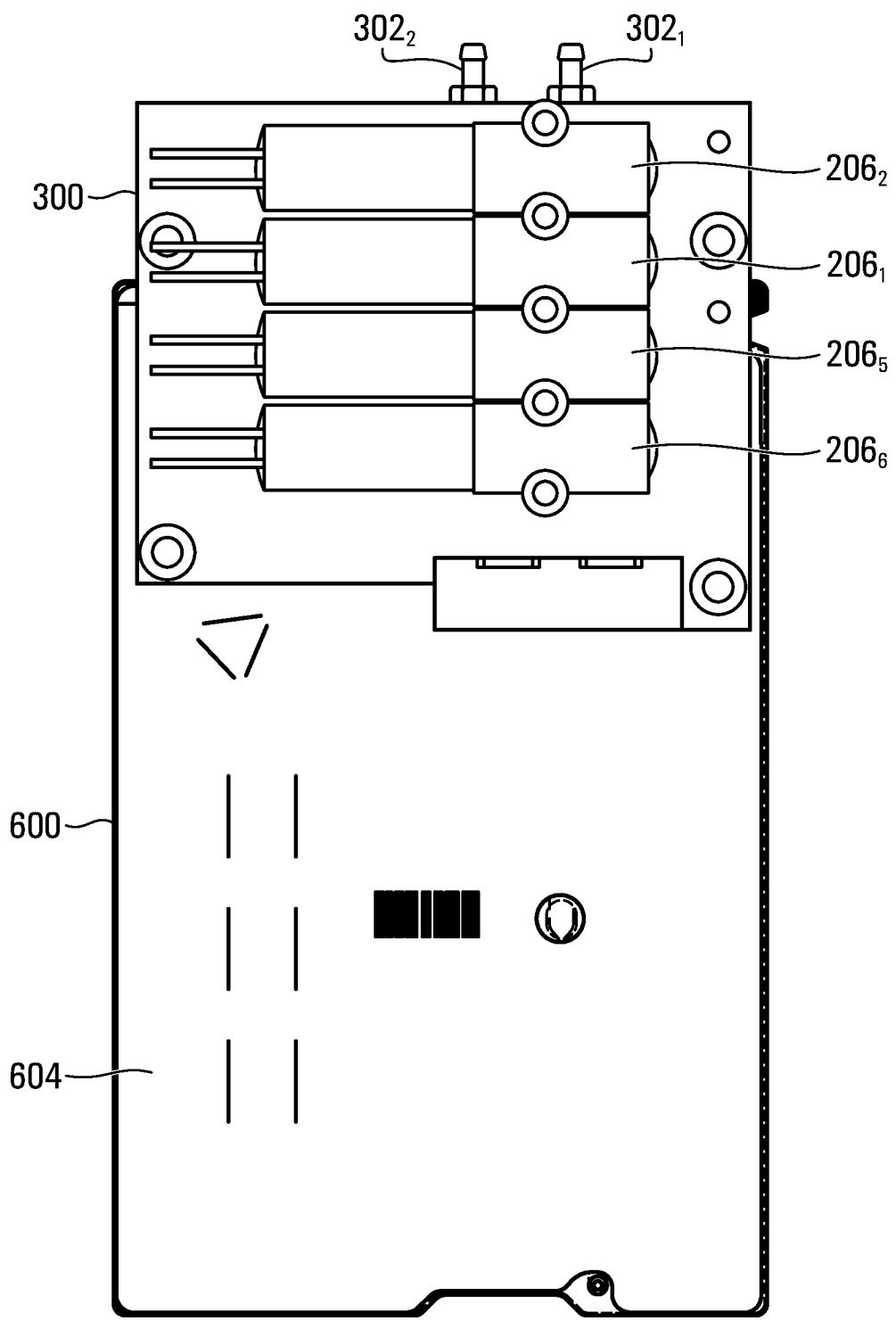
FIG. 18 is a bottom view of FIG. 16.

FIGS. 16 to 18 show top, side and bottom views, respectively, of the diagnostic consumable 600 in relation to the manifold 300 of the delivery system 200 after insertion of the diagnostic consumable 600 into the reader 10. For the sake of clarity, the diagnostic consumable 600 and the manifold 300 are shown in isolation, without other components of the reader 10. Moreover, not all components of the diagnostic consumable 600 are labelled and the diagnostic consumable 600 is shown without the top cover layer 606 in FIG. 16.

The reader 10 may include stops (not shown) to limit the travel and extent to which the diagnostic consumable may be inserted into the opening 12. Thus, upon complete insertion, the diagnostic card 600 is appropriately positioned so as to be operably connectable, with components of the reader 10, including the delivery system 200 and, in the illustrated embodiment, the manifold 300, via the ports of the manifold.

In the illustrated embodiment, upon complete insertion, the diagnostic consumable 600 is positioned with respect to the manifold 300 such that connection structures, for example rubber gaskets 304, 306, are aligned with holes 630, 628, respectively, of the diagnostic consumable 600 and thus connection ports 523, 522, respectively, in turn connecting to the fourth and fifth ports $302_4$ and $302_5$. Rubber gaskets 304, 306, include central apertures that are surrounded by resilient rubber and, in operation, fluidly connect to ports, 523, 522. Upon complete insertion of the diagnostic consumable 600 into the opening 12, the manifold 300 is raised to press the rubber gaskets 304, 306 firmly against bottom surface 604 in order to create an air-tight seal. A back stop 22, which is shown schematically, may be present in the reader 10 and positioned above the diagnostic consumable 600 to counteract the force applied by pressing the rubber gaskets 304, 306, against the diagnostic consumable 600 further aiding to create the air-tight seal.

Figure 19:
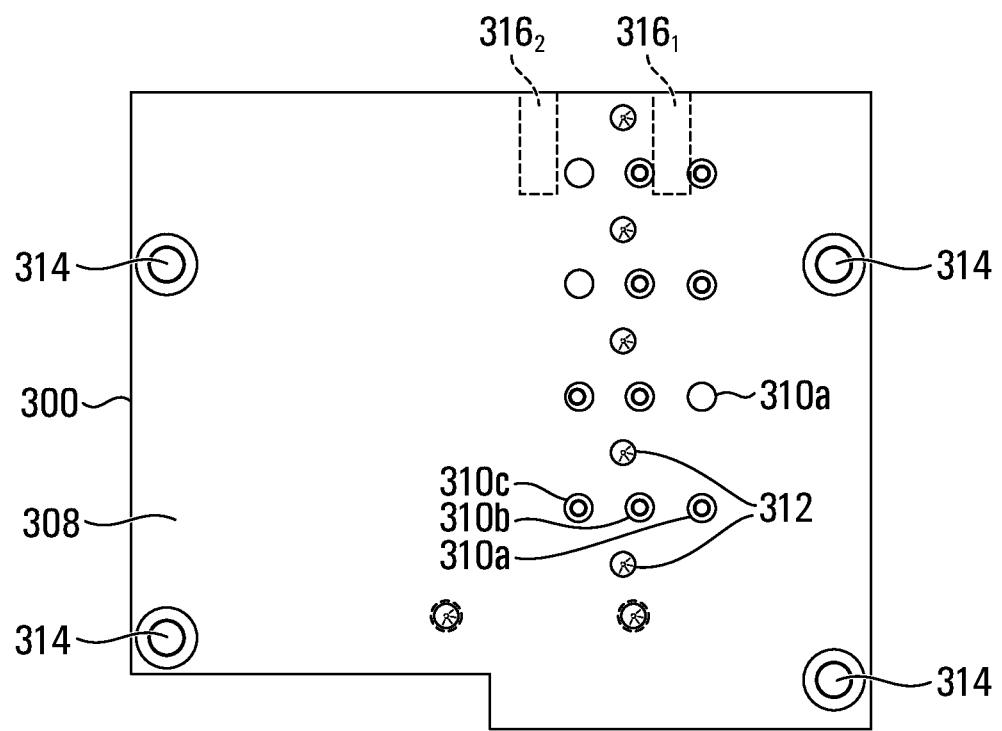
FIG. 19 is a bottom view of the manifold of FIG. 16

FIG. 19 shows a bottom surface 308 of the manifold 300 without the first, second, fifth and sixth valves $206_1$, $206_2$, $206_5$, $206_6$, which may be collectively referred to as the manifold valves. The manifold 300 includes three port recesses 310a, 310b, and 310c for each of the manifold valves, as well as valve mounting holes 312 positioned such that one mounting hole 312 is positioned on either side of each manifold valve. For the sake of clarity, only the port recesses and valve mounting holes for the sixth valve are labeled.

Each of the manifold valves is mounted using pins, bolts, screws or other mounting means inserted through the mounting holes 312. Each of the manifold valves has three ports, which are face-sealed to the manifold 300 in fluid communication with respective port recesses 310a, 310b, and 310c. As can be seen, not every port recess has a through hole. For example, the port recess 310a for the fifth valve $206_5$ does not. Where a port recess does not have a through hole, the port is intentionally blocked to close the path through the respective port of the valve.

Shown in dashed lines are first and second tubing holes $316_1$, $316_2$, respectively, used to connect first and second manifold ports $302_1$, $302_2$.

The manifold 300 also includes four through holes 314 for mounting the manifold 300 internally in the reader 10.

Figure 20:
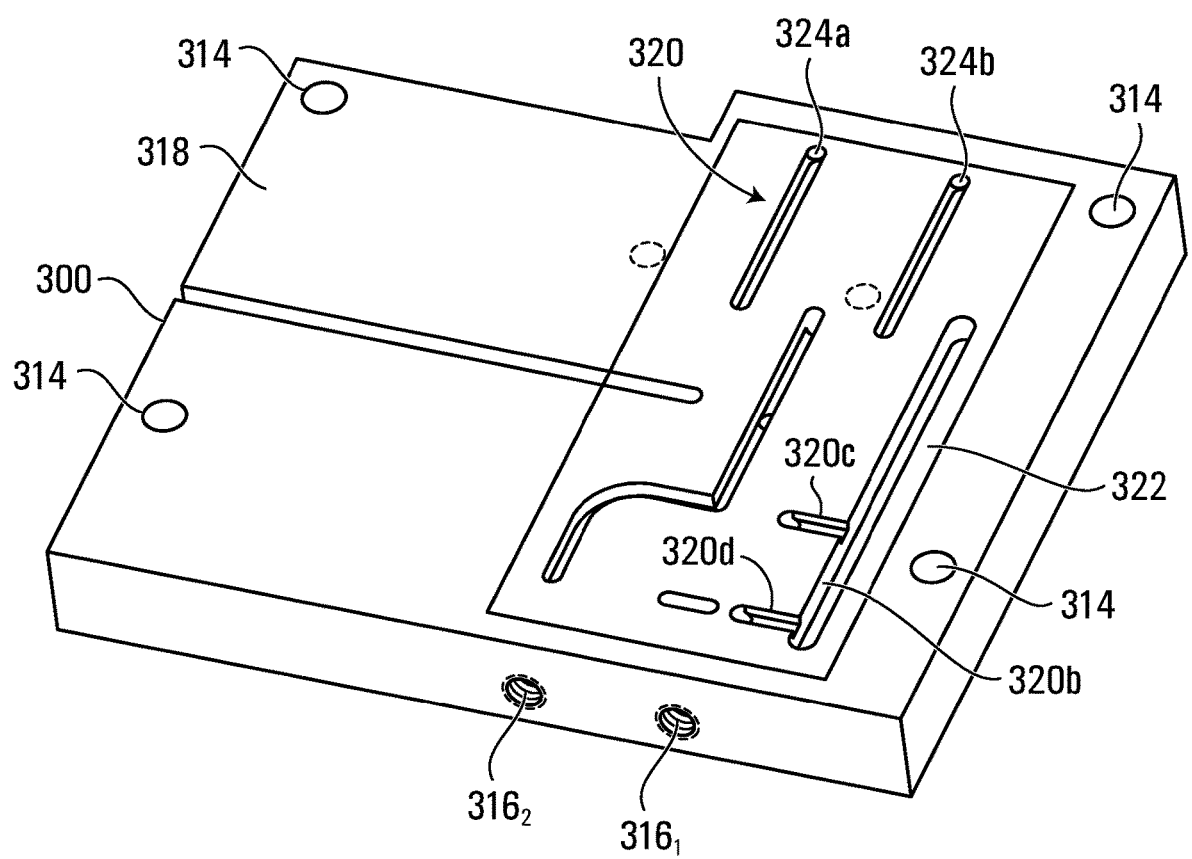
FIG. 20 is a top perspective view of the manifold of FIG. 16.
Figure 21:
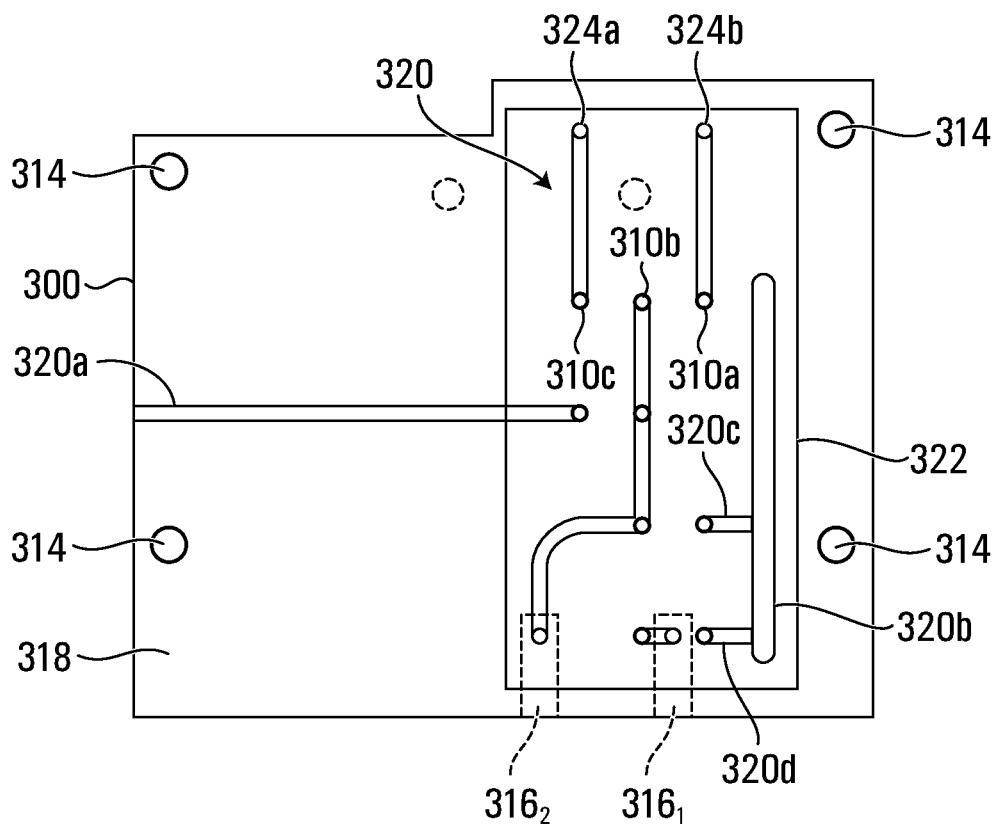
FIG. 21 is a top view of the manifold of FIG. 16.

FIGS. 20 and 21 show a top surface 318 of the manifold 300. Fluid communication between the manifold valves and charge vessel 210 are achieved via air lines, such as channels 320 (or plumbing grooves) provided in or on the manifold 300. In the illustrated embodiment, the channels 320 have been formed or machined into the top surface 318. However, in some embodiments, the manifold 300 may be moulded, such as injection moulded, with the air lines provided by tunnels or spaces formed inside the manifold. The manifold 300 could also be made, among other ways, from two pieces of metal/plastic sealed together with a sealing element such as a large o-ring and clamped together with screws.

Where port recesses 310a, 310b, 310c are through holes, they fluidly connect the respective valve ports to the channels 320.

When the air lines are formed as channels, a label 322 may be applied to the top surface 318 to seal channels that are not intended to be open to atmospheric pressure. Holes 324a and 324b are provided in the label 322 for fluidly connecting the channels 320 to the central apertures of the rubber gaskets 304, 306 and thus fluidly connecting the channels 320 to connection ports 522, 523. The rubber gaskets 304, 306, are in turn mounted on the manifold 300 above label 322. Thus, holes 324a and 324b act as the fourth and fifth ports $302_4$ and $302_5$, discussed above, for connecting the manifold to corresponding testing array portions of the consumable. Atmosphere channel 320a runs outside the label 322 to atmospheric pressure within the reader 10 for venting the fifth valve $206_5$, thereby acting as the third port $302_3$ discussed above.

In the illustrated embodiment, charge vessel 210 is formed by a charge vessel channel 320b and is fluidly connected to the first and second valves $206_1$, $206_2$ via connection channels 320c and 320d, respectively. The dimensions of charge vessel 320b may been chosen to obtain a desired volume, for example 10 μL but a variety of dimensions and shapes may be used depending on the desired volume, configuration of the manifold and/or configuration of the reader 10.

It is also to be understood that any or all of the components shown as embodied in the manifold 300 may be embodied as separate components and fluid connections between components may be embodied in other ways, such as using tubing.

Figure 22:
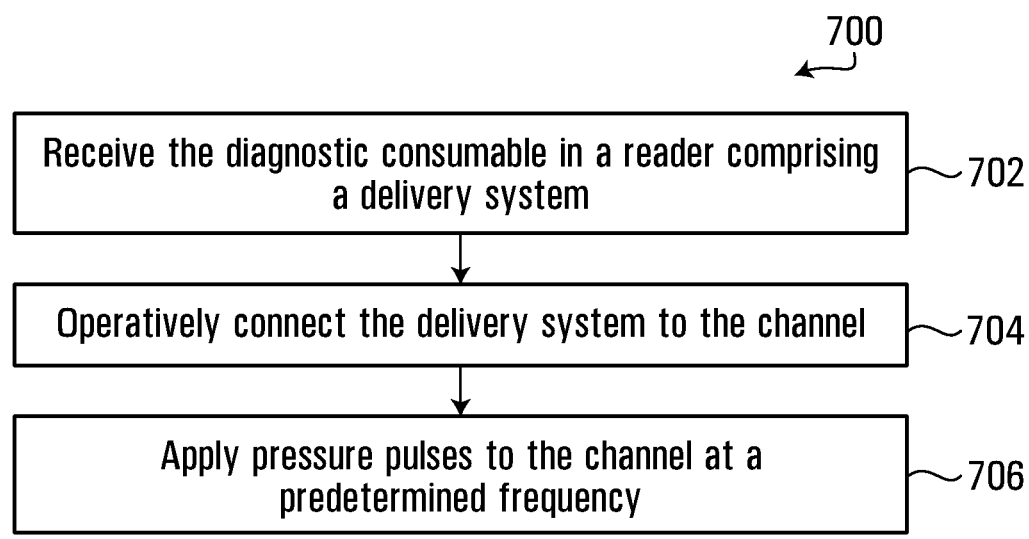
FIG. 22 is flow diagram illustrating an example method for delivering a fluid sample through a channel of a diagnostic consumable according to one embodiment of the present disclosure.

Referring to FIG. 22, embodiments of methods according to the present disclosure will be described. FIG. 22 shows a flow diagram of a method 700 according to one embodiment of the present disclosure for delivering a fluid sample through a channel of a diagnostic consumable, such as the diagnostic consumable 600. The method 700 includes steps 702, 704 and 706.

Step 702 includes receiving the diagnostic consumable in a reader comprising a delivery system. For example, in some embodiments, this includes inserting the diagnostic consumable 600 into reader opening 12 of the reader 10 that comprises the delivery system 200.

Step 704 includes operatively connecting the delivery system to the channel. For example, in some embodiments, such as embodiments where the delivery system operates with vacuum pressure pulses, this includes pressing the manifold 300 against the diagnostic consumable 600 so that rubber gaskets 304, 306 form an air-tight seal between the fourth and fifth ports $302_4$, $302_5$ and connection ports 522, 523, respectively.

For positive pressure pulses this step could include pressing the manifold against input 506 to create an air tight seal.

Step 706 includes applying pressure pulses to the channel at a predetermined frequency. For example, in some embodiments, this includes step-wise ramping up the vacuum driving pressure downstream of the fluid sample. In other embodiments, this may include step-wise ramping up the driving pressure upstream of the fluid sample.

In some embodiments, step 706 includes pressurizing a charging vessel to a predetermined pressure (e.g. vacuum pressure) and fluidly connecting the pressurized charging vessel to the channel. For example, in some embodiments, this includes cycling the first and second valves $206_1$, $206_2$ at a predetermined frequency so that charge vessel 204 is alternatingly pressurized and opened to the channel of the diagnostic consumable 600, thereby step wise ramping up the pressure in the channel. In some embodiments, the frequency of the pressure pulses may be predetermined in dependence on the viscosity or a viscosity range of the fluid samples to be delivered through the channel.

In some embodiments, step 706 includes pressurizing a source vessel operably connected to the charging vessel and using the source vessel to pressurize the charging vessel, wherein a volume of the source vessel is larger than a volume of the charge vessel. For example, in some embodiments, this includes pressurizing source vessel 210 downstream of the charge vessel 204 fluidly connecting the source vessel 210 to the charge vessel 204, such as by opening the second valve 206₂ and closing the first valve 206₁, thus using the source vessel 210 to pressurize the charging vessel 204.

Moreover, in some embodiments, step 706 may include using a pressure source to pressurize the source vessel. For example, in some embodiments, this includes using vacuum pump 208 downstream of the source vessel 210 to pressurize the source vessel by opening the third valve 206₃ and, if present, the fourth valve 206₄, while the second valve 206₂ remains closed.

In some embodiments, the method 700 further includes adjusting the predetermined frequency in dependence on the speed of travel of the fluid sample within the channel. For example, in some embodiments, this includes using controller 400 to change the rate of cycling of the first and second valves 206₁, 206₂ in order to generate a frequency of pressure pulses adapted to the speed of travel of the fluid sample as measured.

The example operations of the method 700 are illustrative of example embodiments. Various ways to perform the illustrated operations, as well as examples of other operations that may be performed, are described herein. Further variations may be or become apparent.

The embodiments of the system and method for delivering a fluid sample through a channel of the diagnostic consumable have been described with reference to a vacuum pressure pulses. However, as discussed above, in some embodiments according to the present disclosure, the pressure pulses may be obtained by generating positive pressure pulses upstream of the fluid sample to "push" the sample through the channel rather than "pull" it through the channel. Accordingly, discussion of principles and implementations of the present disclosure with reference to "vacuum" pressure could be suitably modified to be applied to systems and methods using positive pressure pulses upstream of the fluid sample.

In such embodiments, for example, the delivery system would be operatively connected to the channel upstream of the fluid sample and pressurize a charge vessel at a predetermined frequency with overpressure, which would be opened to the channel. The overpressure behind the fluid sample would force the sample through the channel. The periodic pressure pulses would step-wise ramp up the pressure upstream of the fluid sample. It will be understood that many of the components of the delivery system 200, such as the valves, gauges, source vessel, pump and charge vessel could be used in a positive pressure system that instead creates an overpressure instead of vacuum pressure.

For example, in one embodiment of a delivery system using positive pressure, after sample injection one could seal against input 506 and close, or seal shut, vent 524. Otherwise the sample would be pushed out vent 524. In such embodiments, one could only deliver sample from input 506 to via 528. Alternatively, in some embodiments, one could close input 506 and seal against vent 524. Positive pressures would then be applied. In such an embodiment, one could move/deliver all sample between via 528 and vent 524.

Although the present disclosure relates primarily to delivery systems and methods for delivering a fluid sample, such as a blood sample, through a channel of a diagnostic consumable, the embodiments described herein could also be used in other fluidic devices where a fluid sample is being delivered to a predetermined location within the fluidic device.

The invention claimed is:

1. A reader for reading a diagnostic consumable, the reader comprising:
   a reader opening for receiving the diagnostic consumable; and
   a delivery system configured and arranged to operatively connect to the diagnostic consumable in the reader opening for delivering a fluid sample through a channel of the diagnostic consumable to one or more sensing regions of the diagnostic consumable, the delivery system being downstream of the diagnostic consumable and the one or more sensing regions, the delivery system comprising:
   a vacuum source,
   a charge vessel fluidly connected to the vacuum source upstream of the vacuum source,
   a first valve immediately upstream of the charge vessel, and
   a second valve immediately downstream of the charge vessel, wherein the first and second valves are operable to open and close at a predetermined frequency to alternatingly charge and discharge the charge vessel, thereby applying vacuum pressure pulses to the channel of the diagnostic consumable.

2. The reader of claim 1, wherein the vacuum source comprises a vacuum pump.

3. The reader of claim 1, further comprising a source vessel fluidly connected to the vacuum source and charge vessel between the vacuum source and the charge vessel, wherein a volume of the source vessel is larger than a volume of the charge vessel.

4. The reader of claim 3, further comprising a third valve downstream of the source vessel between the source vessel and the vacuum source, wherein the third valve is operable to close when a source pressure in the source vessel has reached a predetermined vacuum pressure.

5. The reader of claim 1, further comprising a vacuum controller configured to open and close the first and second valves at the predetermined frequency.

6. The reader of claim 5,
   wherein the vacuum controller is further configured to vary the predetermined frequency in dependence on the viscosity of the fluid sample.

7. The reader of claim 1, wherein the charge vessel is dimensioned in dependence on a viscosity range of the fluid samples to be delivered.

8. The reader of claim 1, wherein the first and second valves are solenoid-type valves.

9. The reader of claim 1, further comprising a vacuum controller configured to control the vacuum pressure provided by the vacuum source.

10. The reader of claim 1, wherein the diagnostic consumable is a diagnostic card.

11. The reader of claim 1, further comprising a vacuum controller operative to execute instructions that cause the vacuum controller to operate the first valve in a closed state while operating the second valve in an open state to charge the charge vessel to a vacuum pressure and then to operate the first valve in an open state while operating the second valve in a closed state to apply the vacuum pressure to the channel of the diagnostic consumable.

* * * * *